US011028913B2

(12) United States Patent
Six

(10) Patent No.: US 11,028,913 B2
(45) Date of Patent: Jun. 8, 2021

(54) TWO CHANNEL TRANSMISSION

(71) Applicant: Albert Six, Renton, WA (US)

(72) Inventor: Albert Six, Renton, WA (US)

( * ) Notice: Subject to any disclaimer, the term of this patent is extended or adjusted under 35 U.S.C. 154(b) by 158 days.

(21) Appl. No.: 16/356,490

(22) Filed: Mar. 18, 2019

(65) Prior Publication Data

US 2019/0211909 A1     Jul. 11, 2019

Related U.S. Application Data

(63) Continuation-in-part of application No. PCT/US2017/022326, filed on Mar. 14, 2017.

(51) Int. Cl.
*F16H 37/08* (2006.01)
*B60K 17/16* (2006.01)
(Continued)

(52) U.S. Cl.
CPC ....... *F16H 37/0846* (2013.01); *B60K 17/165* (2013.01); *B60K 23/04* (2013.01); *F16H 9/18* (2013.01); *F16H 37/0806* (2013.01); *F16H 48/06* (2013.01); *F16H 48/08* (2013.01); *F16H 48/10* (2013.01); *F16H 48/36* (2013.01); *F16H 61/662* (2013.01); *B60Y 2400/72* (2013.01); *B60Y 2400/73* (2013.01); *F03D 15/00* (2016.05); *F05B 2260/4021* (2013.01); *F05B 2260/40311* (2013.01);
(Continued)

(58) Field of Classification Search
CPC .. F16H 37/0846; F16H 48/36; F16H 37/0806; F16H 48/08; F16H 1/2854
See application file for complete search history.

(56) References Cited

U.S. PATENT DOCUMENTS 2,164,818 A * 7/1939 Heyer .................. F16H 9/16
                                                                                475/211
2,330,397 A    9/1943 Trofimov
(Continued)

FOREIGN PATENT DOCUMENTS

EP            0149892       7/1985
JP          60175861 A * 9/1985 ......... F16H 37/0846
(Continued)

OTHER PUBLICATIONS

International Search Report and Written Opinion for PCT/US2017/022326, dated May 26, 2017.
(Continued)

*Primary Examiner* — Sherry L Estremsky
(74) *Attorney, Agent, or Firm* — Amin, Turocy & Watson, LLP

(57) ABSTRACT

Technologies relating to two channel transmissions are disclosed. A two channel transmission may comprise a differential or epicyclic gear train disposed inside a case, with input/output shafts extending out of case. A speed variator may link inputs and outputs of the differential or epicyclic gear train. The speed variator may comprise, inter alia, a continuously variable transmission (CVT) and a speed range gear. The CVT may link to an input/output shaft outside the case, and the speed range gear may link to an input/output shaft or carrier gear inside the case. In high-stability embodiments, the speed variator may be replaced by a belt or a set of gears.

20 Claims, 16 Drawing Sheets

(51) Int. Cl.
  *B60K 23/04* (2006.01)
  *F16H 48/06* (2006.01)
  *F16H 48/36* (2012.01)
  *F16H 9/18* (2006.01)
  *F16H 48/08* (2006.01)
  *F16H 48/10* (2012.01)
  *F16H 61/662* (2006.01)
  *F03D 15/00* (2016.01)

(52) U.S. Cl.
  CPC .. *F16H 2037/088* (2013.01); *F16H 2048/362* (2013.01); *Y02T 10/84* (2013.01)

(56) References Cited

U.S. PATENT DOCUMENTS

| | | | | |
|---|---|---|---|---|
| 3,051,019 A | * | 8/1962 | Seliber | F16H 37/0846 |
| | | | | 475/211 |
| 3,247,739 A | * | 4/1966 | Wuesthoff | F16H 37/0846 |
| | | | | 475/211 |
| 3,257,867 A | | 6/1966 | Dennick | |
| 3,370,485 A | * | 2/1968 | Carawan | F16H 37/0846 |
| | | | | 475/211 |
| 3,447,400 A | | 6/1969 | Serniuk | |
| 3,479,908 A | | 11/1969 | Kress | |
| 4,364,229 A | * | 12/1982 | Shiber | B60K 6/12 |
| | | | | 60/414 |
| 4,599,916 A | | 7/1986 | Hirosawa | |
| 4,700,589 A | * | 10/1987 | Coronel | B62D 11/10 |
| | | | | 180/6.2 |
| 4,913,003 A | | 4/1990 | Tervola | |
| 5,073,157 A | * | 12/1991 | Herscovici | F16H 37/084 |
| | | | | 475/211 |
| 5,230,669 A | * | 7/1993 | Tervola | F16H 37/0846 |
| | | | | 475/208 |
| 5,248,283 A | * | 9/1993 | Eckhardt | F16D 3/72 |
| | | | | 464/149 |
| 5,632,703 A | | 5/1997 | Wilkes | |
| 5,669,846 A | * | 9/1997 | Moroto | F16H 37/0846 |
| | | | | 475/211 |
| 5,683,324 A | | 11/1997 | Inoue | |
| 5,820,505 A | | 10/1998 | Parker | |
| 5,827,146 A | * | 10/1998 | Yan | B62M 11/14 |
| | | | | 475/210 |
| 5,910,064 A | | 6/1999 | Kuroki | |
| 6,106,428 A | | 8/2000 | Koneda | |
| 6,293,888 B1 | * | 9/2001 | Moon | F16H 37/0846 |
| | | | | 475/210 |
| 8,771,127 B2 | | 7/2014 | Six | |
| 9,109,681 B2 | | 8/2015 | Six | |
| 2006/0172846 A1 | | 8/2006 | Gassmann | |
| 2006/0229156 A1 | | 10/2006 | Suzuki | |
| 2011/0230300 A1 | | 9/2011 | Six | |
| 2020/0292041 A1 | * | 9/2020 | Zheng | B60K 17/16 |

FOREIGN PATENT DOCUMENTS

| | | | |
|---|---|---|---|
| JP | 07103311 A | * | 4/1995 |
| JP | 11108150 A | * | 4/1999 |
| WO | 2018169521 | | 9/2018 |

OTHER PUBLICATIONS

Kerr: Nissan's CVT transaxle; Canadian Driver online magazine; Apr. 2, 2003; 3 pages Canada.
Bosch: Main Gearboxes Redulus GPV for Wind Turbines; online catalog display; 1 pg.
Visnic: Tech & Trends: Nissan Producing Amazing New CVT; Ward's Auto World; Dec. 1, 1999; 1pg.
Wikipedia: "Differential Pulley"; website; last updated Aug. 3, 2010; 1 pg.

* cited by examiner

TWO CHANNEL TRANSMISSION

CROSS-REFERENCE TO RELATED APPLICATION

This is a continuation in part of PCT Application No. PCT/US17/22326, filed on Mar. 14, 2017 and entitled "TWO WAY TRANSMISSION". The contents of the prior filed application are incorporated by reference herein.

BACKGROUND

Differentials are well known for their application in the auto industry. Differentials are devices capable of transmitting rotation through three shafts. For example, as used in automobiles, a rotating drive shaft may apply a torque to a differential input. The differential transmits the torque to two output axle shafts, each axle shaft turning one of the road wheels. In this scenario, the differential allows each of the road wheels to turn at different speeds, for example, as the automobile turns, an inner road wheel may turn at a slower speed than an outer road wheel.

Differentials can also be used in differential output control apparatus, for example as described in U.S. Pat. Nos. 8,771,127 and 9,109,681. However, there is a need to further extend and adapt such differential output control apparatus in order to accommodate various circumstances in the field, as may arise in connection with various engineered systems.

SUMMARY

Technologies relating to a two channel transmission apparatus are disclosed. Some example two channel transmissions may comprise a differential or epicyclic gear train disposed inside a case. A first input/output shaft may be affixed to a first sun gear of said differential or epicyclic gear train. The first input/output shaft may extend out of the case via a first opening in the case. A second input/output shaft may be affixed to a second sun gear of said differential, or to a ring gear of said epicyclic gear train. The second input/output shaft may optionally extend out of the case via a second opening in the case.

Example two channel transmissions may further comprise a speed variator comprising at least a controllable continuously variable transmission (CVT), a speed variator shaft, and a speed range gear. The CVT may be coupled with one of the input/output shafts outside the case. The speed variator shaft may extend from the CVT into the case to the speed range gear, via a third opening in the case. The speed range gear may be inside the case and may be meshingly engaged therein with a gear affixed to one of the input/output shafts, or a carrier gear. Two channel transmission outputs may be controllable, at least in part, by controlling the CVT.

Some embodiments may be adapted for high stability. Example high-stability two channel transmission apparatus may comprise, e.g., a differential disposed inside a case, and a first shaft affixed to a first sun gear of said differential. A second shaft may be affixed, at a proximal end of said second shaft, to a second sun gear of said differential, and a gear may be affixed at a distal end of said second shaft. A third shaft may be fitted, at a proximal end thereof, with two gears, a first of said two gears meshingly engaging with a carrier gear of the differential, and a second of the two gears meshingly engaging with the gear at the distal end of the second shaft. Distal ends of the first and third shafts may be configured to couple with input or output applications of the high-stability two channel transmission apparatus. Further details and description of the various embodiments are provided below.

DETAILED DESCRIPTION

The illustrative embodiments provided herein are not meant to be limiting. Other embodiments may be utilized, and changes may be made, without departing from the spirit or scope of the subject matter presented here. It will be understood that aspects of the present disclosure may be arranged, substituted, combined, and designed in a wide variety of different configurations.

Technologies relating to two channel transmissions are disclosed. A two channel transmission may comprise a differential or epicyclic gear train disposed inside a case, with input/output shafts extending out of case. A speed variator may link inputs and outputs of the differential or epicyclic gear train. The speed variator may comprise, inter alia, a CVT and a speed range gear. The CVT may link to an input/output shaft outside the case, and the speed range gear may link to an input/output shaft or carrier gear inside the case.

Figure 21:
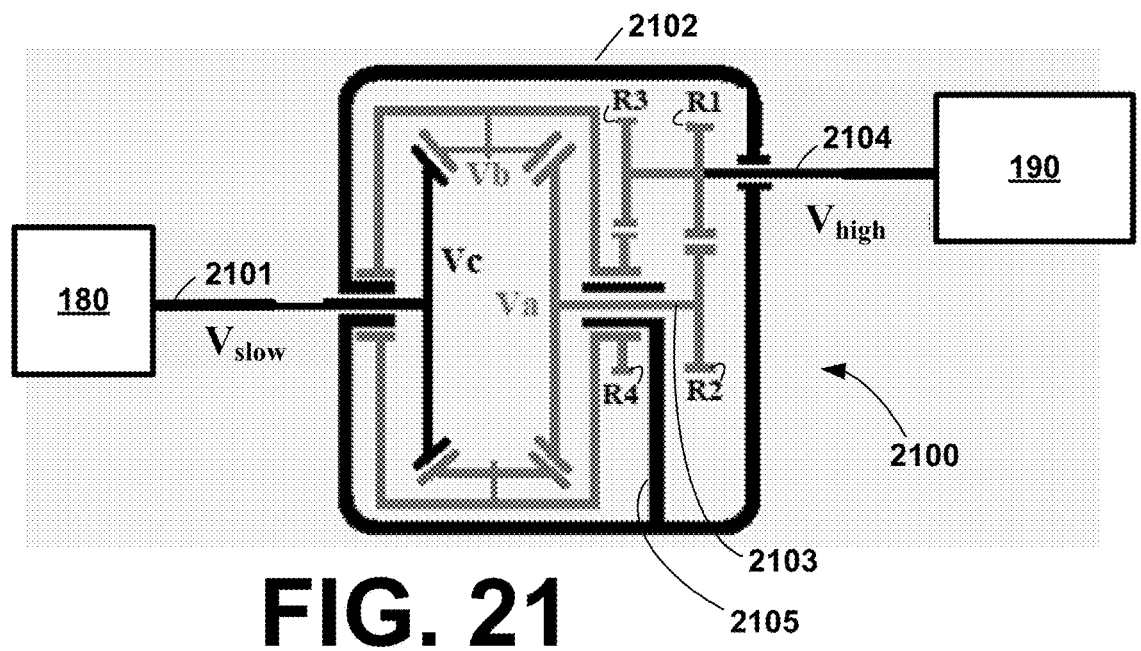
FIG. 21 is a schematic diagram of an example high-stability two channel transmission apparatus.
Figure 22:
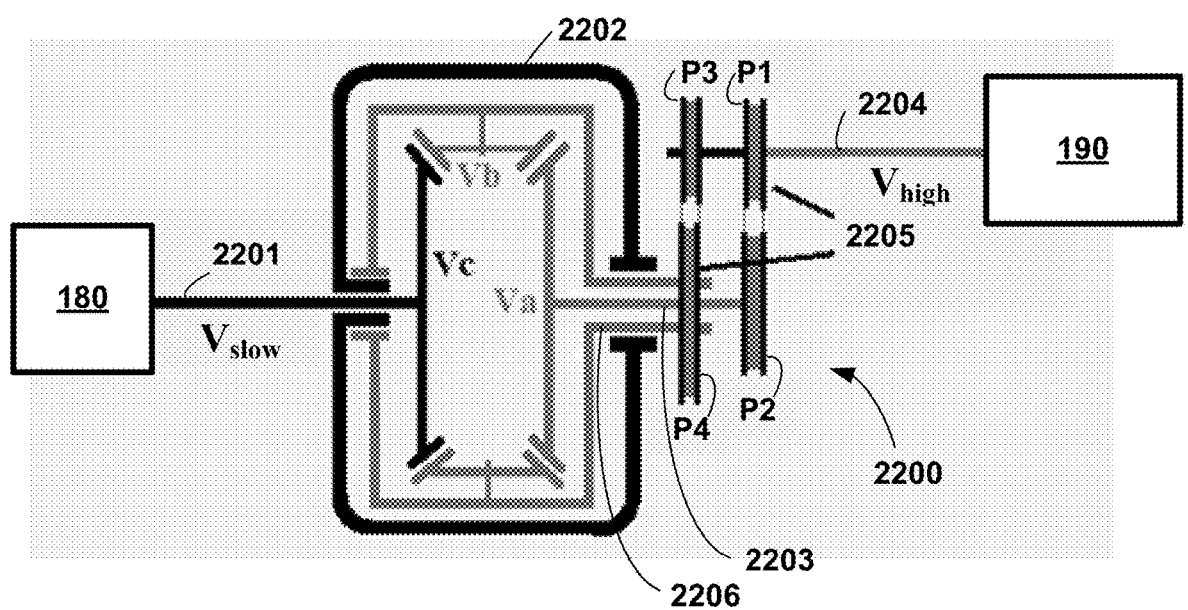
FIG. 22 is a schematic diagram of another high-stability two channel transmission apparatus.

FIG. 1-FIG. 9, and corresponding description herein, disclose differential output control technologies, which may be used in connection with the two channel transmission apparatus provided herein. Example two channel transmission apparatus are disclosed in FIG. 10-FIG. 19. FIG. 21-FIG. 22 disclose example high-stability two channel transmission apparatus.

Figure 1:
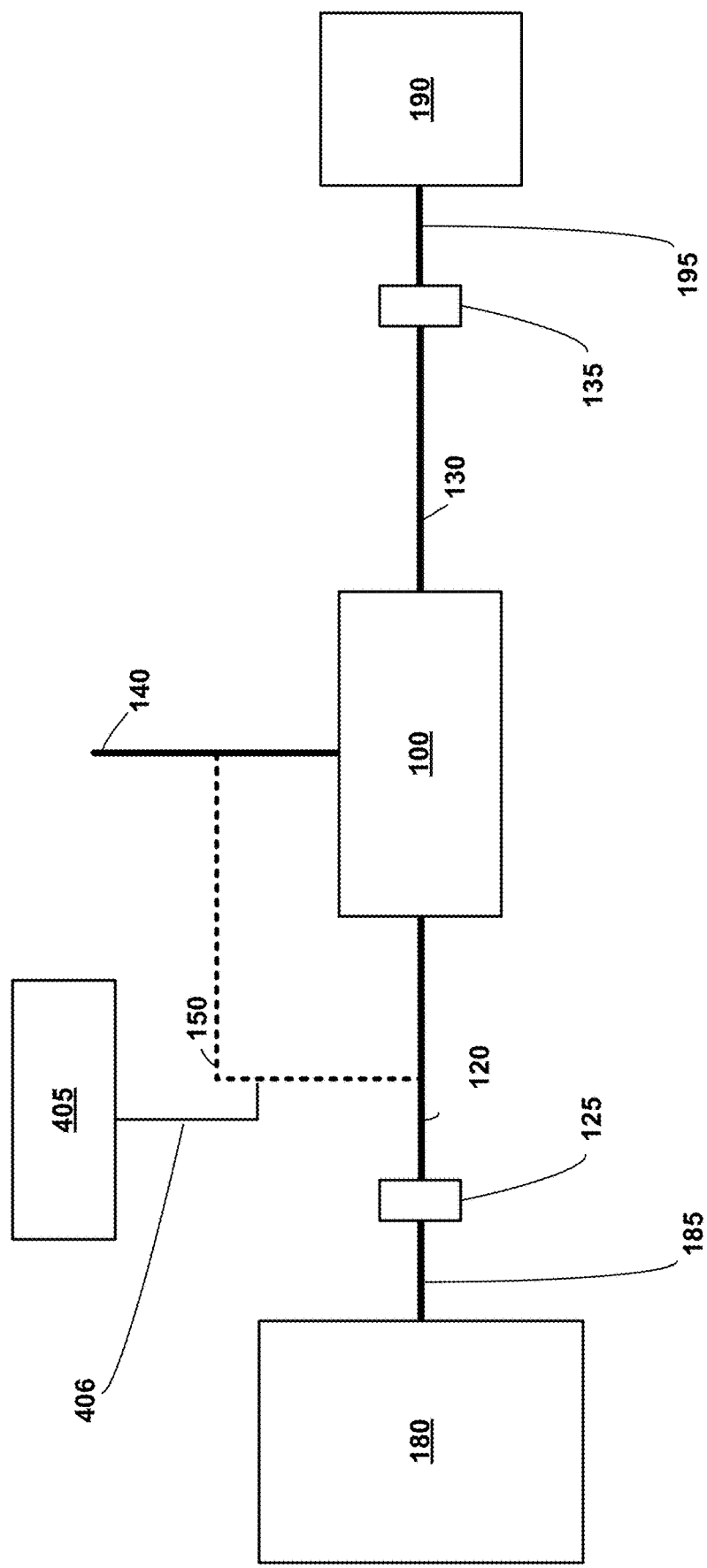
FIG. 1 illustrates a differential output control apparatus coupled between a rotating device output and a controlled rotating output.

FIG. 1 illustrates a differential output control apparatus coupled between a rotating device output 185, and a controlled rotating output 195. The rotating device output 185 may comprise, for example, a rotating shaft driven by a device 180. The differential output control apparatus may be used to receive the output at 185, and to apply a desired rotation speed and or torque to the controlled rotating output 195. The controlled rotating output 195 may be coupled to an application 190 that is driven by the device 180, and that is controlled at least in part by the differential output control apparatus. In one example embodiment, the device 180 may comprise a speedboat motor, and the application 190 may comprise a propeller. The differential output control apparatus may be used at least in part to control the rotation speed and/or torque at the propeller. Of course, the differential output control apparatus may be deployed in conjunction with any number of other devices 180 and applications 190.

The differential output control apparatus comprises a differential 100 and an adjustable mechanical link 150 between two linked differential inputs. As will be appreciated, a differential 100 may comprise, or be coupled with, three input/output options, including a first application shaft 120, a second application shaft 130, and a carrier gear, which may for example be coupled with a system input/output shaft 140. The term "application shaft" is used herein to refer to shafts coupled with sun gears in the differential 100, and the term "system input/output shaft" is used herein to refer to a shaft coupled to the carrier gear of a differential 100. First and second application shafts 120 and 130 may occasionally be referred to herein as input/output shafts 120 and 130. Also, the first and second application shafts 120 and 130 and carrier gear 105 are all referred to herein as differential inputs.

The adjustable mechanical link 150 may be adjusted, for example, using a control system 405, such as an electronic or computer control, which may be adapted to adjust the adjustable mechanical link 150 to adjustment settings received at and/or calculated by the adjustable mechanical link control system 405. The control system 405 may receive and/or calculate adjustment settings, for example based on information received from a computerized control system, sensors coupled to the control system 405, and/or from human-adjusted controls coupled to the control system 405. The control system 405 may for example send control signals via the communication link 406 to adjust the adjustable mechanical link 150. For example, in some embodiments, control system 405 may be used to keep the motor of a car running at its speed of maximum efficiency on the freeway, or its speed of minimum pollution in city, or its speed of maximum power to climb a hill. Such adjustments can be done automatically by using the actual torque and speed.

Figure 2A:
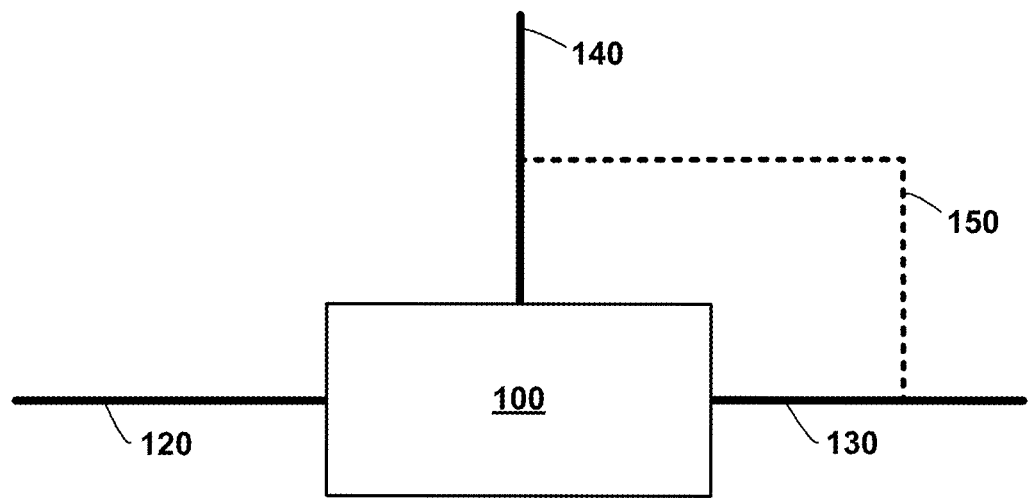
FIG. 2A and FIG. 2B illustrate alternative embodiments for a differential output control apparatus.
Figure 2B:
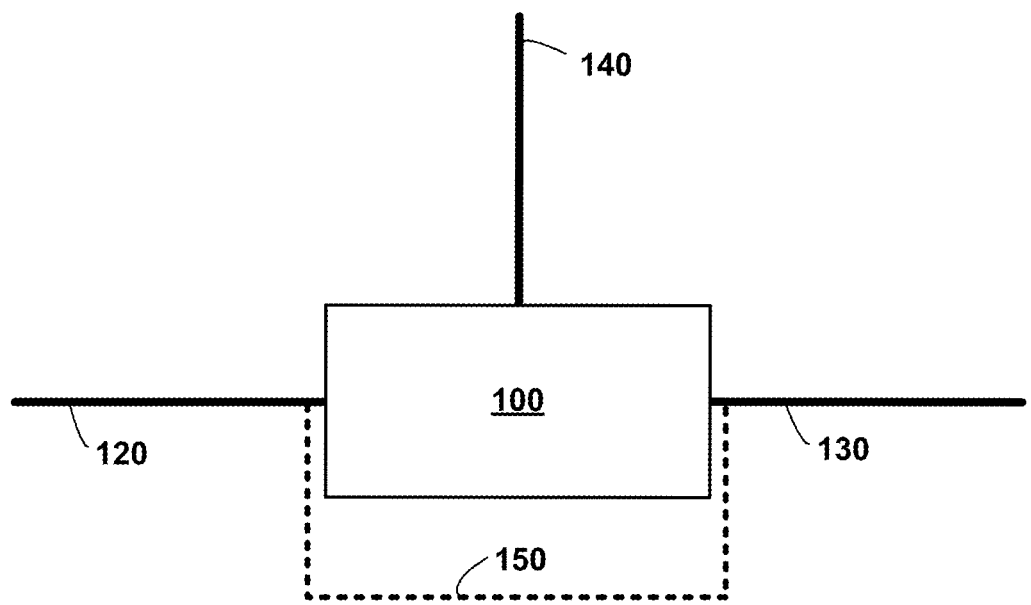

In FIG. 1, the two linked differential inputs include the first application shaft 120 and system input/output shaft 140. It will be appreciated that in various embodiments, as illustrated in FIG. 2A and FIG. 2B, the adjustable mechanical link 150 may be situated between the system input/output shaft 140 and the second application shaft 130, as shown in FIG. 2A, or between the first application shaft 120 and the second application shaft 130, as shown in FIG. 2B. It will also be appreciated that the rotating device output 185 could be coupled to any of the differential inputs/outputs 120, 130, or 140, or to the adjustable mechanical link 150. Similarly, the controlled rotating output 195 could be coupled to any of the differential inputs/outputs 120, 130, or 140, or to the adjustable mechanical link 150.

In some embodiments, the adjustable mechanical link 150 may comprise a rigid link, such as a gearbox or speed variator, and/or a flexible link such as a torque converter. In general, a rigid link may comprise any link adapted to control rotation speeds of a first linked differential input and a second linked differential input, wherein the rigid link permits only rotation speeds resulting from rigid link adjustment settings. In other words, for a given input to the differential 100, and a given rigid link adjustment setting, there is only one allowable rotation speed for a first linked differential input, and only one allowable rotation speed for a second linked differential input. The rigid link adjustment setting may be changed to change the speeds of the linked differential inputs. A flexible link may comprise any link structure that is adapted to adjust a relative torque applied to one or more of the two linked differential inputs, without requiring particular rotation speed(s). A torque converter is one example of a flexible link.

The adjustable mechanical link 150 may be configured to turn the two linked differential inputs in a same direction (e.g., both clockwise, or both counterclockwise), and/or in opposite directions. In some embodiments, the adjustable mechanical link 150 may be configured to turn the two linked differential inputs in only a same direction as that of the rotating device output 185. In some embodiments, the adjustable mechanical link 150 may be configured to turn the two linked differential inputs in only an opposite direction as that of the rotating device output 185. In some embodiments, the adjustable mechanical link 150 may be configured to turn the two linked differential inputs in only opposite directions from one another, e.g., with one of the linked differential inputs turning a same direction as the rotating device output 185, and the other of the linked differential inputs turning an opposite direction as the rotating device output 185. Embodiments in which the adjustable mechanical link 150 can turn the two linked differential inputs in both a same direction and opposite directions, e.g., by turning the two linked differential inputs first in a same direction, then switching modes to turn them in an opposite direction, are also possible and may employ two adjustable mechanical link structures which can be switched to allow switching from same direction to opposite direction mode.

A configuration of the adjustable mechanical link 150 may be selected to implement a differential output control apparatus with desired characteristics. For example, referring to the first application shaft 120 as A, the second application shaft 130 as C, and the system input/output shaft 140 (or carrier gear) as B, example rigid link configurations include: a first configuration in which the adjustable mechanical link 150 is coupled between A and B, and the adjustable mechanical link 150 is configured to turn A and B in a same direction; a second configuration in which the adjustable mechanical link 150 is coupled between A and B, and the adjustable mechanical link 150 is configured to turn A and B in opposite directions; a third configuration in which the adjustable mechanical link 150 is coupled between A and C, and the adjustable mechanical link 150 is configured to turn A and C in a same direction; and a fourth configuration in which the adjustable mechanical link 150 is coupled between A and C, and the adjustable mechanical link 150 is configured to turn A and C in opposite directions.

In the first configuration referred to above (Input A-Output C-link between A and B-same direction), the relationship between the speeds of the various differential inputs/outputs may be described as:

$$V_A + V_C = 2V_B$$

Where V is a rotation speed of a differential input or output. If the rigid link is a speed variator providing a ratio k, then:

$$V_B = kV_A$$

And therefore:

$$V_C = V_A(2k-1)$$

And the relationship between the torques may be defined as:

$$T_C = T_A/(2k-1)$$

Where T is a torque on a differential input or output. When the ratio k tends to 0.5, the output speed $V_C$ tends to zero and the output torque $T_C$ increases towards infinity, and when k increases above 0.5, the sense of direction changes. Also, when the speed variator's ratio k varies between 0.5 to 2, for example, the output speed at $V_C$ varies from zero to 300% of the input. Thus the disclosed apparatus and methods can be used to produce dramatically increased output speeds/torques from a very limited range of input speeds/torques.

In the second configuration referred to above (Input A-Output C-link between A and B-opposite direction), the relationship between the speeds of the various differential inputs/outputs may be described as:

$$V_A + V_C = 2V_B$$

If the rigid link is a speed variator providing a ratio k, then:

$$V_B = -kV_A$$

And therefore:

$$V_C = -V_A(2k+1)$$

And the relationship between the torques may be defined as:

$$T_C = T_A/(2k+1)$$

In the third configuration referred to above (Input A-Output B-link between A and C-same direction), the relationship between the speeds of the various differential inputs/outputs may be described as:

$$V_A + V_C = 2V_B$$

If the rigid link is a speed variator providing a ratio k, then:

$$V_C = kV_A$$

And therefore:

$$V_B = V_A(1+k)/2$$

And the relationship between the torques may be defined as:

$$T_B = 2T_A/(1+k)$$

In the fourth configuration referred to above (Input A-Output B-link between A and C-opposite direction), the relationship between the speeds of the various differential inputs/outputs may be described as:

$$V_A + V_C = 2V_B$$

If the rigid link is a speed variator providing a ratio k, then:

$$V_C = -kV_A$$

And therefore:

$$V_B = V_A(1-k)/2$$

And the relationship between the torques may be defined as:

$$T_B = 2T_A/(1-k)$$

In some embodiments, the control system 405 may be configured to apply the above relationships, or other relationships as may be extrapolated for other configurations, in controlling adjustment settings for a differential output control apparatus. For example, for a given rotating device output 185, the above relationships may be applied to calculate adjustment settings for the adjustable mechanical link 150, to produce a desired output at the controlled rotating output 195.

In some embodiments, the differential output control apparatus may be coupled to the rotating device output 185 via an interface 125, and the differential output control apparatus may be coupled to the controlled rotating output 195 via another interface 135. The interfaces 125 and 135 may comprise, for example, male or female interface elements, such as hexagonal or other multisided elements couplable with rotating device output 185 and controlled rotating output 195.

Figure 3A:
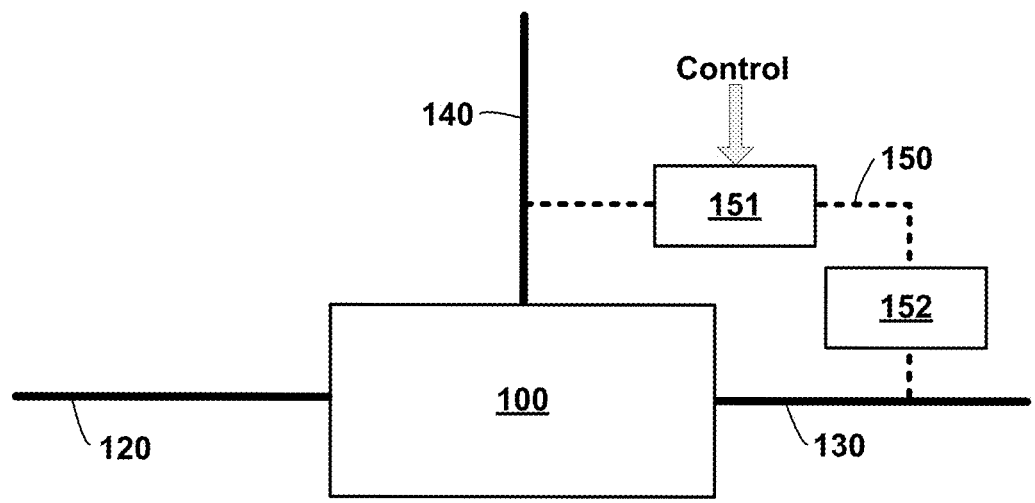
FIG. 3A and FIG. 3B illustrate various embodiments employing an adjustable mechanical link comprising a CVT and gears.
Figure 3B:
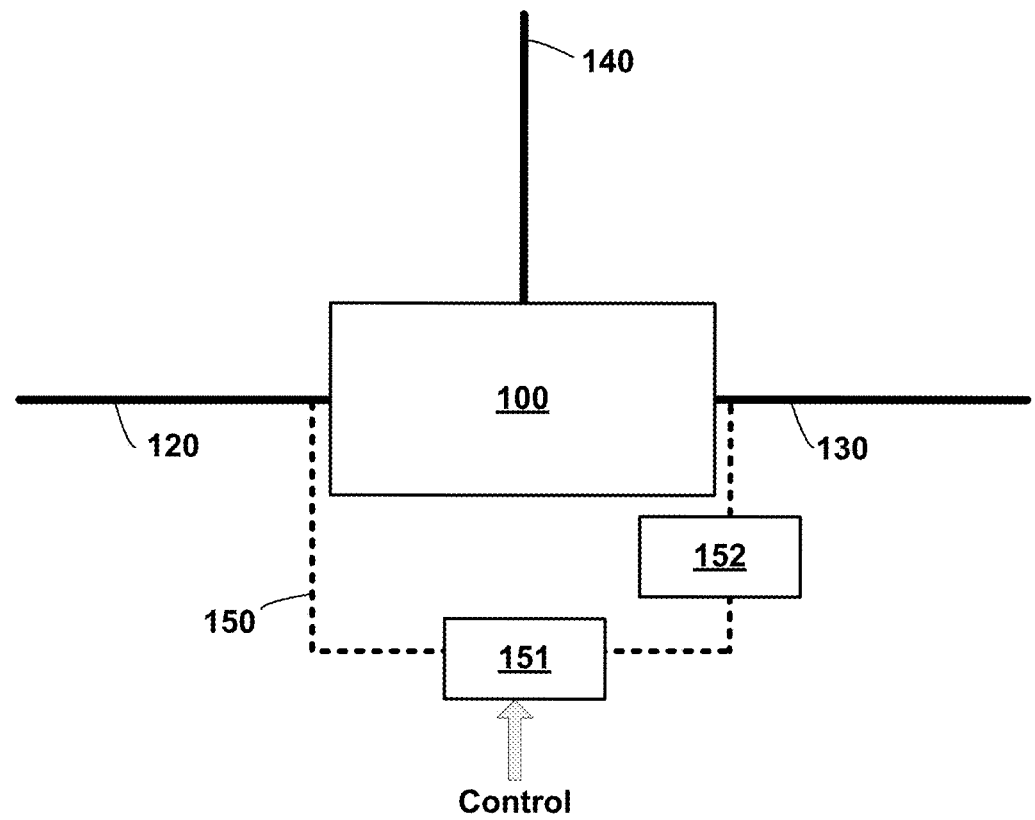

FIG. 3A and FIG. 3B illustrate various embodiments employing a CVT 151 and gears 152 along an adjustable mechanical link 150 of a differential output control apparatus. In FIG. 3A, the adjustable mechanical link 150 is between an application shaft (either 120 or 130) and the system input/output shaft 140. In FIG. 3B, the adjustable mechanical link 150 is between the application shafts 120 and 130. In FIG. 3A and FIG. 3B, the CVT 151 may have a continuously variable gear ratio k1, which is controllable either manually or by a controller as described herein. The gears 152 may have a fixed gear ratio k2. The ratio k2 may be used to adapt the speed range of the differential output control apparatus as appropriate for any particular application. When gears 152 include an even number of gears, there is a change of direction and k2 is negative. For an odd number of gears, there is no change of direction, and k2 is positive. The overall ratio k of the adjustable mechanical link 150 may be derived from k1 and k2, e.g., k=k1×k2.

Figure 4:
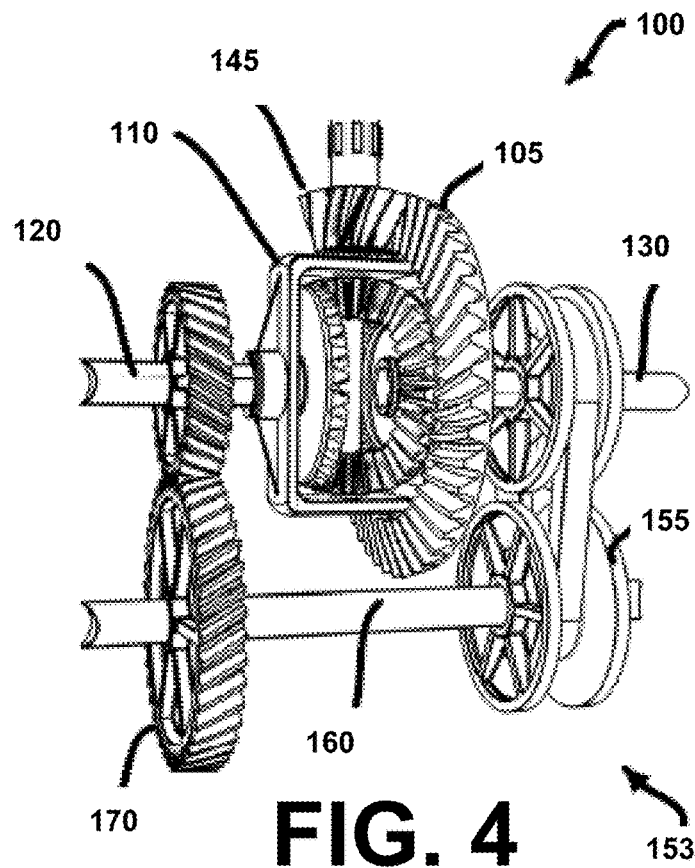
FIG. 4 illustrates an example differential output control apparatus using a speed variator as an adjustable mechanical link.
Figure 5:
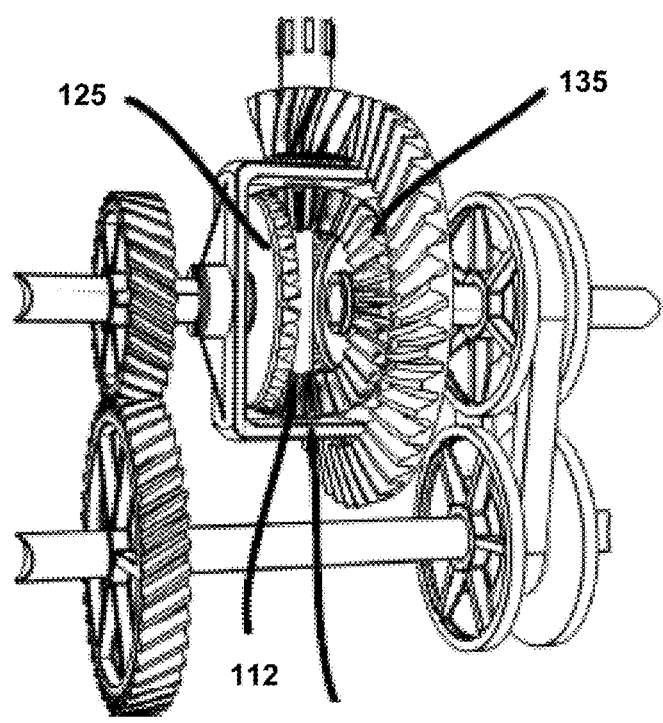
FIG. 5 illustrates an example differential output control apparatus using a speed variator as an adjustable mechanical link.

FIG. 4 and FIG. 5 illustrate an example differential output control apparatus employing a speed variator, in accordance with some embodiments of this disclosure. FIG. 4 and FIG. 5 are identical; the same figure is included twice to allow room for clearly indicating the various components of the example differential output control apparatus. FIG. 4 and FIG. 5 illustrate a differential 100 and speed variator 153. The differential 100 includes a carrier gear 105 fixedly coupled to a cage 110, wherein the carrier gear 105 is couplable with a system input/output gear 145, such as may be coupled with a shaft 140 illustrated in FIG. 1, FIG. 2A and FIG. 2B, and FIG. 3A, FIG. 3B, and FIG. 3C. One or more planet gears 112 are rotatably coupled to cage sidewalls 111. A first sun gear 125 is coupled to a first application shaft 120, and meshingly engages with the one or more planet gears 112. A second sun gear 135 is coupled to a second application shaft 130, and also meshingly engages with the one or more planet gears 112. In FIG. 4 and FIG. 5, the first and second application shafts 120 and 130 extend in opposite directions away from the first and second sun gears 125 and 135, respectively.

In FIG. 4 and FIG. 5, an adjustable mechanical link in the form of speed variator 153 is coupled to two linked differential inputs, comprising the first and second application shafts 120 and 130. The speed variator 153 comprises a rigid mechanical link between the first and second application shafts 120 and 130, the rigid mechanical link configured to translate rotation in one of the application shafts 120 or 130 into an opposite direction rotation in the other of the application shafts 120 or 130. The speed variator 153 includes a speed variator shaft 160 that is coupled to the first application shaft 120 by speed range gear 170, which meshingly engages with a gear on the first application shaft 120, as shown. The speed variator shaft 160 is coupled to the second application shaft 130 by variable diameter pulley 155, which couples shafts 160 and 130 via a belt encircling pulley 155 as well as a pulley on the second application shaft 130, as shown.

In some embodiments which may be understood with reference to FIG. 4 and FIG. 5, the speed range gear 170 may be replaced with a belt and pulleys similar to the variable diameter pulley 155. This would turn the shafts 120 and 130 in a same direction. Also, the speed range gear 170 or variable diameter pulley 155 may be replaced for example with a gear or belt arrangement configured to turn the carrier gear 105 or cage 110, so that the speed variator 153 provides an adjustable mechanical link between either the first or second application shaft 120 or 130 and the carrier gear 105.

In an example application of the differential output control apparatus illustrated in FIG. 4 and FIG. 5, a rotating device output 185, e.g., a motor output, may be coupled to the differential output control apparatus. The rotating device output 185 may be coupled at any of the differential inputs, including the first application shaft 120, the second application shaft 130, or the carrier gear 105. In some embodiments, the rotating device output 185 may be coupled to the speed variator 153, e.g., to the speed variator shaft 160. The rotating device output 185 may operate at a variable or constant speed, while the speed variator 153, optionally in conjunction with a control system 405, adjusts the relative rotation speed of the first and second application shafts 120 and 130 to produce a desired output speed and/or a desired output torque at the controlled rotating output 195.

As with the rotating device output 185, the controlled rotating output 195 may be coupled to any of the differential inputs, including the first application shaft 120, the second application shaft 130, or the carrier gear 105, and may also be coupled with the speed variator 153. The controlled rotating output 195 is coupled to a different differential input than the rotating device output 185. In some embodiments, where the rotating device output 185 is coupled to an adjustable mechanical link 150 and/or to a differential input that is among the differential inputs which are linked by the adjustable mechanical link 150, the controlled rotating output 195 may be coupled to a differential input that is not among the differential inputs which are linked by the adjustable mechanical link 150, and vice versa. For example, in FIG. 4 and FIG. 5, if the rotating device output 185 is coupled to the speed variator shaft 160, then controlled rotating output 195 may be coupled with the carrier gear 105, e.g., via the system input/output gear 145.

In a configuration in which the rotating device output 185 is coupled to the speed variator shaft 160 and the controlled rotating output 195 is coupled with the carrier gear 105, by adjusting the speed variator 153, rotation speed and torque of the carrier gear 105 may be controlled. The rotation of the carrier gear 105 may also be stopped and/or reversed by adjusting the relative rotation speed of the first and second application shafts 120 and 130. The speed range gear 170 may establish, at least in part, a defined speed range of the carrier gear 105 and controlled rotating output 195.

In another example application of the differential output control apparatus illustrated in FIG. 4 and FIG. 5, a generator may be coupled to the differential output control apparatus as a controlled rotating output 195. For example, a generator may be coupled with the first application shaft 120. Meanwhile, a variable speed rotating device output 185 such as a wind turbine may be coupled with the differential output control apparatus as a rotating device output 185, e.g., at the carrier gear 105 or system input/output gear 145. The differential output control apparatus may be configured to adjust the speed variator 153 operate the generator at a constant, optimal speed, regardless of the variable speed at the rotating device output 185.

An example operation of the apparatus illustrated in FIG. 4 and FIG. 5 will now be described in detail. A motor or other device 180 may be coupled to the first application shaft 120. The motor turns first application shaft 120 at a rotation speed $V_A$. The first sun gear 125 thereby also turns at rotation speed $V_A$, as well as the gear on the first application shaft 120 that meshingly engages with the speed range gear 170. The speed variator shaft 160 and variable diameter pulley 155 turn at a rotation speed $V_S$, defined by $V_A$ and the gear ratio at the speed range gear 170. The speed variator shaft 160 and variable diameter pulley 155 also turn in an opposite direction as the first application shaft 120.

The rotation of the variable diameter pulley 155 turns the second application shaft 130 at a rotation speed $V_C$, where $V_C$ is defined by the rotation speed $V_S$ and the diameter ratio at the pulley 155. The second application shaft 130 also rotates in an opposite direction from the first application shaft 120. The second sun gear 135 also rotates at speed $V_C$, in the opposite direction as the first sun gear 125, along with the second application shaft 130.

As the first and second application shafts 120 and 130 turn the first and second sun gears 125 and 135, the sun gears 125 and 135 turn the planet gears 112, the planet gears 112 turn the cage 110 and carrier gear 105, and the carrier gear 105 optionally turns the system input/output gear 145. The carrier gear 105 turns at speed $V_B$. The direction of rotation, speed, and torque of the carrier gear 105 is defined by the rotation speeds $V_A$ and $V_C$. When $V_A$ and $V_C$ are equal, the cage 110 and carrier gear 105 do not rotate. As $V_A$ becomes larger than $V_C$, the carrier gear 105 rotates in a first direction, at increasing speed $V_B$ and decreasing torque as the difference between $V_A$ and $V_C$ grows. In the opposite scenario, as $V_C$ becomes larger than $V_A$, the carrier gear 105 rotates in a second direction (opposite direction), at increasing speed $V_B$ and decreasing torque as the difference between $V_A$ and $V_C$ grows. Thus it will be observed that the direction of rotation, speed $V_B$, and torque of the carrier gear 105 may be adjusted by adjusting the relative rotation speeds $V_A$ and $V_C$ of the first and second application shafts 120 and 130 as the first and second application shafts 120 and 130 rotate in opposite directions. This adjusting may be accomplished for example via the speed variator 153, e.g., by adjusting the diameter of the variable diameter pulley 155.

The above description of FIG. 4 and FIG. 5 is for the purpose of generally describing the illustrated apparatus, however it will be appreciated that in addition to the various potential modifications of elements of the apparatus itself, there are numerous variations in how the apparatus may be deployed. For example, a rotating device output and controlled rotating output may be coupled to any of the various differential inputs or to the adjustable mechanical link, as described herein.

Some example methods may include methods for producing desired controlled rotating output 195 speeds and/or desired controlled rotating output 195 torques from a rotating device output 185. The relative rotation speeds of the linked differential inputs, e.g., the relative rotation speeds of the first and second application shafts 120 and 130 in FIG. 4 and FIG. 5, may be adjusted with the adjustable mechanical link 150, to produce the desired rotation speed and/or desired output torque at the controlled rotating output 195, e.g., at the system input/output gear 145 in FIG. 4 and FIG. 5.

It will be appreciated that a variety of configurations of differential 100 are feasible. Some differential configurations may generally include the elements illustrated in FIG. 4 and FIG. 5, while some differential configurations may include different elements and arrangements. For example, epicyclic differentials, spur-gear differentials, active differentials, ball differentials, limited slip differentials, locking differentials, and any other differential, whether known or developed in the future, may be adapted for use in connection with embodiments of this disclosure.

Similarly, it will be appreciated that a variety of configurations of a speed variator 153 are feasible. Speed variator 153 embodiments may employ any of a variety of structures adapted to adjust the relative rotation speeds of linked differential inputs. For example, one or more cone elements may be provided in place of the variable diameter pulley 155, as discussed further herein. The variable diameter pulley 155, cone elements, or other structures may be adjusted manually, mechanically, and/or electronically using structures such as dials, gears, electromagnets, screws, sliders, springs, or any number of other structures as will be appreciated.

Figure 6:
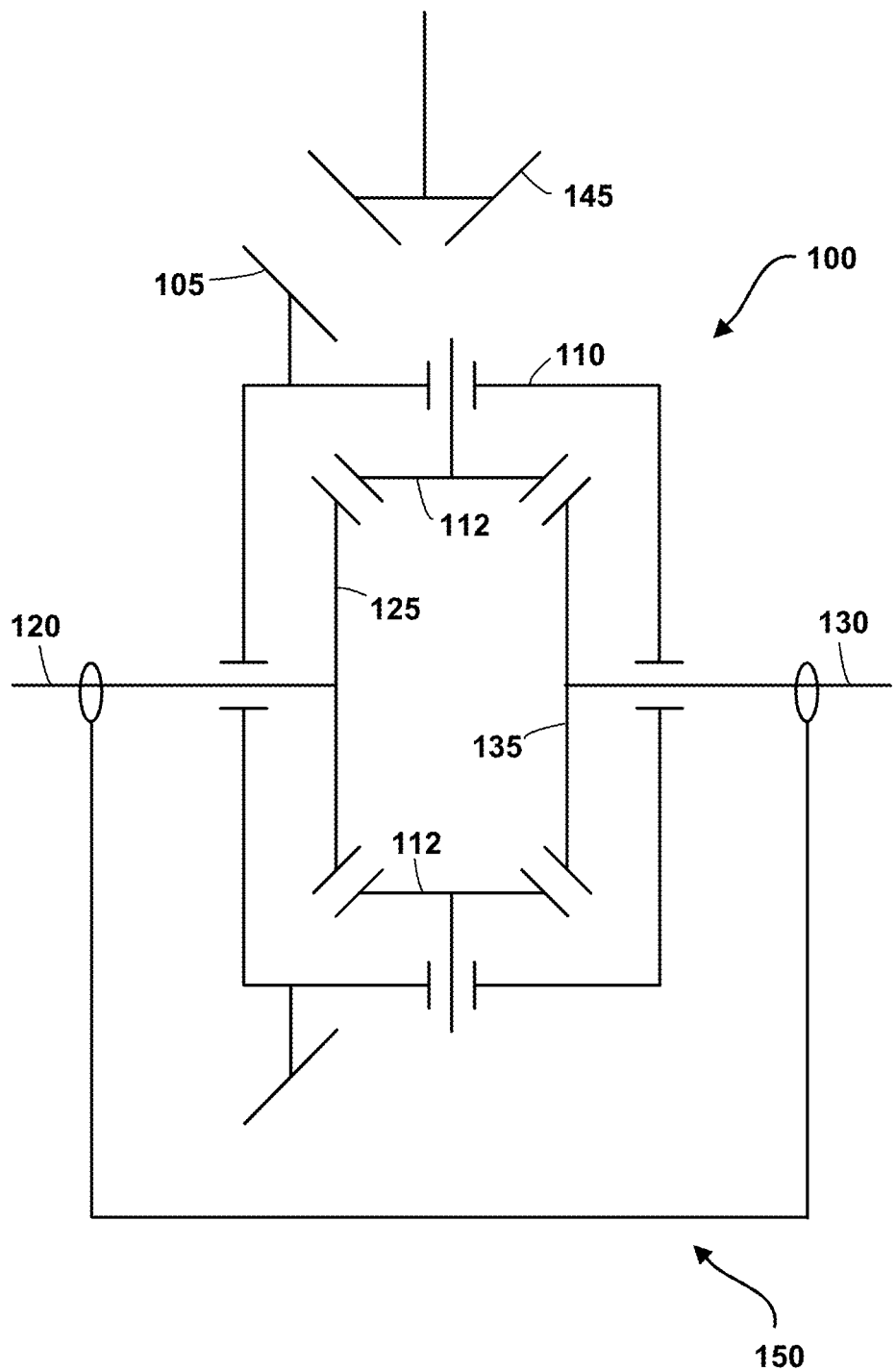
FIG. 6 illustrates a schematic diagram of an example differential output control apparatus.

FIG. 6 illustrates a schematic diagram of a differential output control apparatus. FIG. 6 illustrates the differential 100 with elements noted in FIG. 4 and FIG. 5, comprising carrier gear 105, cage 110, input/output gear 145, planet gears 112, first sun gear 125, first input/output shaft 120, second sun gear 135, and second input/output shaft 130. FIG. 6 also illustrates an adjustable mechanical link 150 coupled with first input/output shaft 120 and second input/output shaft 130.

Figure 7:
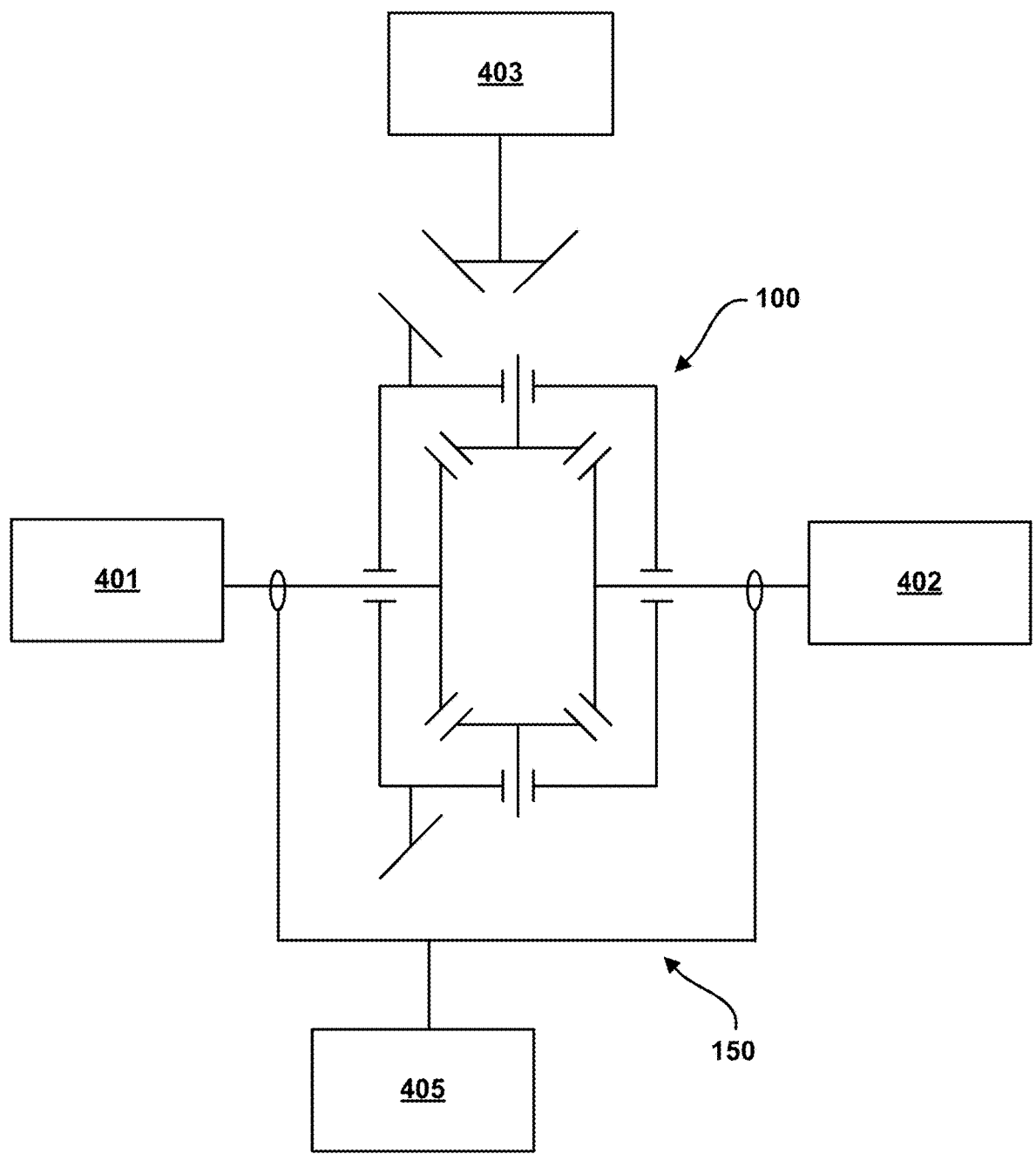
FIG. 7 illustrates a schematic diagram including the example differential output control apparatus of FIG. 6, along with example inputs and outputs that may be connected to the apparatus and a control system configured to adjust the adjustable mechanical link.

FIG. 7 illustrates a schematic diagram including the example differential output control apparatus of FIG. 6, along with example inputs/outputs 401, 402, and 403 that may be connected to the apparatus, and a control system 405 configured to adjust the adjustable mechanical link 150. In general, inputs/outputs 401, 402, and 403 may be any input or output, including, for example, a rotating device output 185 from a device 180, and a controlled rotating output 195 to an application 190, either of which may comprise motors, generators, wind turbines, drive shafts, locomotive wheels, winches or hoists, or any other input or output.

In some embodiments, an input/output such as 401, 402, or 403 may be provided on two of the differential inputs, while the other of the differential inputs is placed in a collar adapted to allow rotation as adjusted by the mechanical link 150. In some embodiments, one of the inputs/outputs such as 401, 402, or 403 may be coupled with the adjustable mechanical link 150, such as with one or more ends of a speed variator shaft 160, and one of the differential inputs may be coupled with another of the inputs/outputs 401, 402, or 403, while the remaining differential inputs and free ends of the adjustable mechanical link 150 are placed in a collar adapted to allow rotation as adjusted by the adjustable mechanical link 150. Control system 405 may comprise, for example, a mechanical control system and/or electronic control system, either of which may be coupled to human or machine interfaces configured to support human and/or computer control of the adjustable mechanical link 150.

In some embodiments, the speed variator 153 may divide an input/output 401 (for example) into two channels moving in either same or opposite directions, while also allowing for controlling/adjusting a relative rotation speed of linked differential inputs, e.g., the first and second input/output shafts 120 and 130. Adjusting a relative rotation speed by control system 405 may comprise, for example, adjusting a diameter of a variable diameter pulley 155 or a belt position of a moving belt 503, thereby adjusting a speed of one or more of the first and second input/output shafts 120 and 130. Meanwhile, a rotation speed of the other of the linked differential inputs, e.g., the first and second input/output shafts 120 and 130, may optionally be simply known and used as a reference, adjusted, and/or may be held constant.

In some embodiments, a differential output control apparatus may be configured to control speed and/or torque at the first input/output shaft 120, the second input/output shaft 130, and/or the carrier gear 105. This may be accomplished by calculating a speed of a first linked differential input, e.g., speed $V_A$ of the first input/output shaft 120, relative to the speed of a second linked differential input, e.g., speed $V_C$ of the second input/output shaft 130, that will produce a desired speed and/or torque result; determining a mechanical link adjustment setting configured to produce the calculated speeds $V_A$ and/or $V_C$, and applying the adjustment setting to the adjustable mechanical link 150. The calculating may for example include inputting known variables into a formula defining the relationship between $V_A$, $V_B$, and $V_C$ for the apparatus, and calculating the unknown or desired variables using the formula. In some embodiments $V_C$ may be proportional to the difference between $V_A$ and $V_B$, e.g.:

$$2V_B = V_A - V_C$$

Where $V_B$ is the rotation speed of the carrier gear 105, $V_A$ is the rotation speed of the first input/output shaft 120, and $V_C$ is the rotation speed of the second input/output shaft 130, as described above. Also, the torque at the carrier gear 105 increases as the speed $V_B$ decreases, which relationship may also be represented by a formula. Also, in some embodiments, the speed range of the device 180 may be amplified by the differential output control apparatus, allowing the apparatus to produce a wider speed range than that of the device 180. Such implementation details may be accounted for in the calculating process as will be appreciated.

Thus, by knowing/controlling any one of the above variables $V_A$, $V_B$, and/or $V_C$, along with knowing/controlling the relative rotation speed of the linked differential inputs (e.g., the first and second input/output shafts 120 and 130 in FIG. 7), a desired effect may be produced in the third of the above variables $V_A$, $V_B$, and/or $V_C$. Similarly, by knowing/controlling one of the input/outputs 401, 402, 403 and the relative speeds $V_A$, $V_B$, and/or $V_C$, a desired result may be produced in another of the input/outputs 401, 402, 403.

Returning briefly to FIG. 4 and FIG. 5, it will be appreciated that by modifying one or more gear ratios within the illustrated apparatus, it is possible to amplify or reduce the speed range of an output at the carrier gear 105 with respect to an input at, for example, the first input/output shaft 120. For example, the gear ratio at the speed range gear 170, defined by the size of the gear 170 compared to the size of the gear on the first input/output shaft 120, may be selected to produce a desired speed range of the apparatus. Similarly, the ratios of the variable diameter pulley 155 and/or other gears and couplings in the apparatus may be defined to set desired parameters and ranges of the apparatus.

In some embodiments, a differential output control apparatus may include and/or be combined with a torque converter. A torque converter may be used as an adjustable mechanical link 150 as described above. Also, in some embodiments, a torque converter may be positioned along the speed variator shaft 160.

Figure 8:
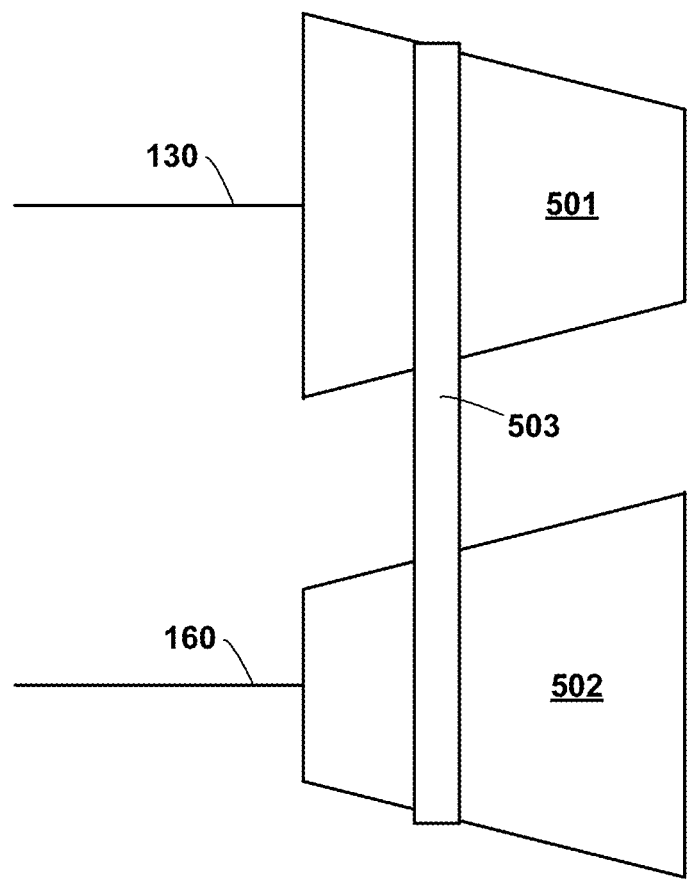
FIG. 8 illustrates an example speed variator configured with a cone element.

FIG. 8 illustrates an example speed variator configured with a cone element. A speed variator shaft 160 may be coupled with a cone element 502. The cone element 502 may for example be coupled with a complementary cone element 501 affixed to the second input/output shaft 130. In addition to the illustrated elements, the speed variator 153 may include a mechanism for moving the belt 503, thereby adjusting the rotation speed of the second input/output shaft 130. The illustrated elements may for example replace the variable diameter pulley 155 and complementary pulley shown in FIG. 4 and FIG. 5.

In some embodiments, a differential output control apparatus as described herein may be coupled with a motor providing a rotating device output, for example, at one or more of the adjustable mechanical link 150, the input/output 401 at the first input/output shaft 120, and/or the input/output 402 at the second input/output shaft 130. In some embodiments, the motor may be configured to operate at a constant motor speed. A constant motor speed may be selected, for example, as an optimal motor operating speed. The optimal motor speed may be a most energy/fuel efficient speed and/or a speed that optimizes any other aspect of motor operation. The adjustable mechanical link 150 and/or control system 405 may be configured to adjust the relative rotation speed of the linked differential inputs to produce one or more of a desired output speed and a desired output torque at a controlled rotating output, as a function of the constant motor speed. A desired controlled rotating output speed or torque may for example be received at the control system 405, e.g., via an input provided by a human or computer control system, and the control system 405 may be configured to calculate the adjustment setting of the adjustable mechanical link 150 that produces the desired speed or torque, and to then adjust the adjustable mechanical link 150 to the calculated adjustment setting.

In some embodiments, a differential output control apparatus as described herein may be coupled with a generator, for example, as a controlled rotating output. A generator may for example be coupled to one or more of the adjustable mechanical link 150 or any of the differential inputs/outputs 120, 130, or 105. The adjustable mechanical link 150 may be configured to adjust the relative rotation speed of the linked differential inputs to produce a constant generator speed regardless of the speed of rotation of a rotating device output received by the differential output control apparatus. For example, a wind turbine, hydroelectric turbine, gasoline or diesel engine, or other energy source may serve as an input 403, driving input/output gear 145 that meshingly engages with the carrier gear 105. A generator may be coupled as an output 401 to the first input/output shaft 120. A variable speed $V_B$ of the carrier gear 105 may be electronically monitored by a control system 405, and the control system 405 may be configured to adaptively adjust the adjustable mechanical link 150 to produce a constant or near constant generator speed or torque. In some embodiments, the control system 405 may be configured to adaptively adjust relative speeds of $V_A$ and $V_C$ to maintain a constant, optimal operation speed at the first input/output shaft 120 (in this example), according to a constant, optimal operation speed for the generator at 401.

Figure 9:
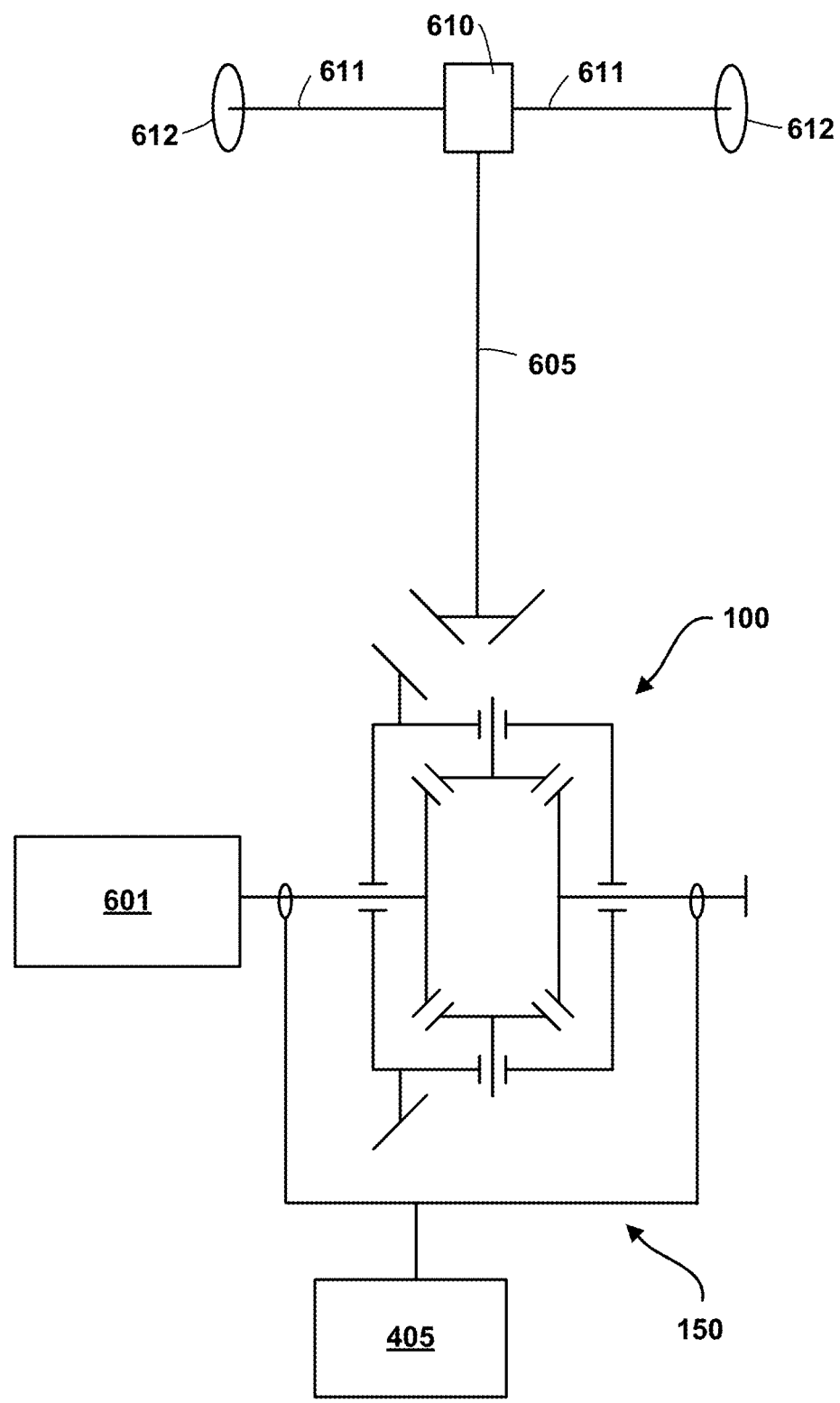
FIG. 9 illustrates a differential output control apparatus coupled with a drive shaft of an automobile or other vehicle.

FIG. 9 illustrates a speed variator and differential apparatus coupled with a drive shaft of an automobile or other vehicle. FIG. 9 comprises a differential 100 and adjustable mechanical link 150 including control system 405. A first input/output shaft of the differential is coupled to an engine 601. An input/output gear driven by the carrier gear of the differential 100 is coupled with a drive shaft 605. The drive shaft 605 is coupled to a differential 610 which drives axles 611 and road wheels 612.

In FIG. 9, an example optimal speed for the engine 601 may be 4000 Rotations Per Minute (RPM). An example input needed to the conventional differential 610 is a range of 0 to 1000 RPM, and also including the ability to operate in reverse. To produce the desired speed range, the adjustable mechanical link 150 may for example be configured to adjust the rotation speed of the second input/output shaft within a range configured to produce the desired range at the drive shaft 605. For example, zero (0) RPM at the drive shaft may be produced by driving the second input/output shaft at a speed equal to the first input/output shaft, in this example, 4000 RPM. The speed variator 153 may be configured to drive the second input/output shaft at a slower speed relative to the first input/output shaft (slower than 4000 RPM) to drive the drive shaft 605 in a first direction, up to the desired maximum RPM (1000 RPM). The speed variator 153 may be configured to drive the second input/output shaft at a faster speed relative to the first input/output shaft (faster than 4000 RPM) to drive the drive shaft 605 in a second direction (e.g., reverse), up to the desired maximum RPM (1000 RPM or any desired maximum speed for reverse).

In some embodiments according to FIG. 9, instead of, or in conjunction with, pressing on the gas pedal of a vehicle, the driver may activate an adjustment in the adjustable mechanical link 150, e.g., by providing an input to the control system 405. An increase in the energy required at the output drive shaft 605 will tend to make the engine 601 slow down. The engine may be configured with a speed regulator configured to increase the gas intake and move the engine RPM back to its optimum, e.g. 4000 RPM in the example above.

In some embodiments, as may be appreciated from the above example from FIG. 9, a differential output control apparatus as described herein may be configured as a speed reducer, to reduce a high speed input, e.g., at input 401, to a low speed output, e.g., at output 403, in one step.

In some embodiments, a differential output control apparatus as described herein may be configured to produce smooth changes of direction, e.g., from forward to reverse in the above example from FIG. 9. As the sun gears 125 and 135 approach a same speed (in opposite directions), the carrier gear 105 approaches zero speed. As the relative speed of either of the sun gears increases relative to the other, the carrier gear 105 increases in speed. Thus, direction changes at the carrier gear 105 may be preceded by smoothly slowing to zero speed, then smoothly speeding up in an opposite rotation direction.

In some embodiments, a differential output control apparatus as described herein may be configured to regulate an input/output such as 401, 402, and/or 403 at a constant speed, or according to any desired speed function, as another input input/output 401, 402, and/or 403 varies. This is described herein for example in the context of operating motor, engine, or generator at a constant speed. In some embodiments, the apparatus may be configured to maintain an engine or generator at an optimum operating efficiency. In some embodiments, the apparatus may be configured to maintain constant torque or a constant speed at an output.

In some embodiments, a locomotive comprising a differential output control apparatus may be provided. For example, in locomotives in which a fluid transmission has been replaced by a torque converter, a differential output control apparatus described herein could avoid converting from mechanical energy (e.g., an output of a diesel locomotive engine) to electrical energy, and back to mechanical energy (in the form of torque on the locomotive wheels). In some embodiments, small 'push-pull' locomotives using a torque converter may for example include a differential output control apparatus as described herein.

In some embodiments, a differential output control apparatus as described herein may be configured as a lifting or pulling apparatus such as a winch or hoist. For example, a motor may be coupled to an input 401, and operated at a constant speed as described above. The motor speed may for example be selected for maximum motor power. Meanwhile, the output 403 may comprise a drum that winds and unwinds a cable to raise, lower, and/or pull a load. A cable tension may be monitored and the control system 405 may be configured to receive cable tension information, calculate an adjustment setting for the adjustable mechanical link 150 to prevent overloading the motor, and adjust the adjustable mechanical link 150 to the calculated setting. In some embodiments, a human operator may provide an input to the control system 405 to adjust the adjustable mechanical link 150.

FIG. 10-FIG. 19 illustrate example two channel transmission apparatus which may employ the differential output control technologies disclosed in FIG. 1-FIG. 9, above. The illustrated two channel transmission apparatus incorporate Continuously Variable Transmissions (CVTs) coupled with differentials. CVTs can advantageously change through a continuous range of effective gear ratios. However, when employed by themselves (without the accompanying differentials illustrated in FIG. 10-FIG. 19) the speed range of CVTs is limited and their output speed does not go down to zero. In contrast, when CVTs are coupled with differentials as illustrated in FIG. 10-FIG. 19, the output speed range of the resulting two channel transmission devices is dramatically expanded, and can go down to zero, while also dramatically increasing output torque. Two channel transmission devices illustrated in FIG. 10-FIG. 19 may therefore be usefully included in a diverse range of applications such as tractors, bulldozers, automobiles, snowmobiles, wind turbines, street cars, race cars, marine propulsion, speed variators, railroad trains, etc.

In general, while the various two channel transmission devices illustrated in FIG. 10-FIG. 19 are arranged according to various different example embodiments, each combines similar elements, including:

Three gears A, B and C meshingly engaged with one another and turning around a same axis in such a way that Va+Vc=2Vb. Differentials and epicyclics are two structures which satisfy such a relationship.

A CVT.

A control of the ratio of the CVT. This control can be manual or automatic.

A set of gears to adapt the output speed range to various applications.

Conceptually, the two channel transmission devices divide the input torque into two channels. What prevents the input from going only through one channel and ignoring the other? The answer is the satellite gear Vb. It pivots on itself and it turns around the horizontal axis. This is what results in equalized torque in each channel. If one torque is higher than the other, the gear Vb spins on itself to make them equal. When a car is going in straight line at constant speed, the speed of the motor Vmotor and the speeds of the wheels V1 and V2 remain constant. There is a ratio between Vmotor and V1 determined by the gearbox. When the car turns around a corner, we modify the ratio Vmotor/V1 and that produces a change in the speed V2 of the other wheel. Turning the steering wheel of the car thus has a similar effect as modifying the ratio of the CVT in the illustrated two channel transmission apparatus.

Figure 10:
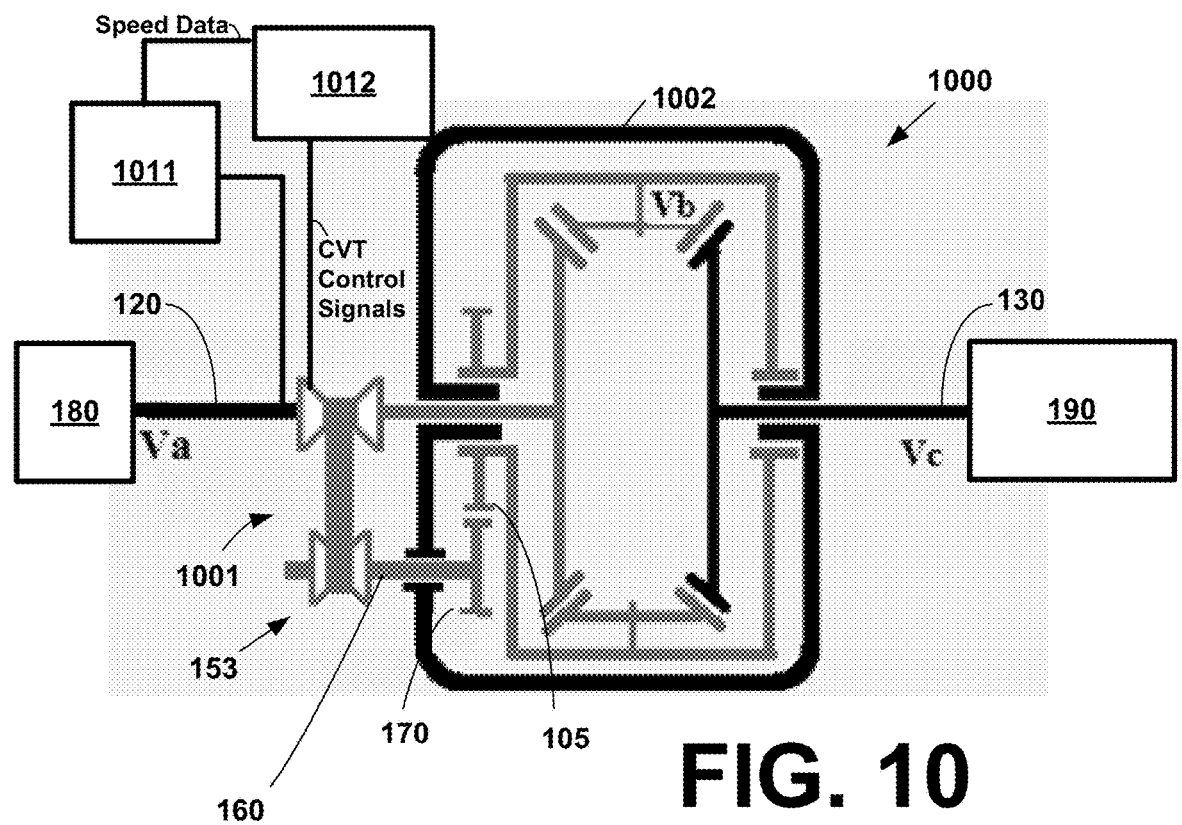
FIG. 10 is a schematic diagram of an example two channel transmission apparatus comprising a differential.

FIG. 10 is a schematic diagram of an example two channel transmission apparatus comprising a differential, in accordance with at least some embodiments of the present disclosure. In FIG. 10, like elements introduced in FIG. 1-FIG. 9 are given like identifiers. FIG. 10 includes a two channel transmission apparatus 1000 between device 180 and application 190. Two channel transmission apparatus 1000 comprises, inter alia, a speed variator 153 coupled with a differential. The differential is disposed inside a case 1002. Some elements of speed variator 153 are inside of case 1002, and other elements of speed variator 153 are outside of case 1002.

In FIG. 10, the elements of the differential will be understood from FIG. 1-FIG. 9. The differential includes sun gears, planet gears, and a cage with a carrier gear 105. The carrier gear 105 is illustrated to one side of the differential as shown. Likewise, the elements of the speed variator 153 will be understood from FIG. 1-FIG. 9. The speed variator 153 includes a continuously variable transmission (CVT) 1001, a speed variator shaft 160, and a speed range gear 170. The speed range gear 170 is meshingly engaged with the carrier gear 105 of the differential inside of case 1002. The CVT 1001 may comprise two variable diameter pulleys, as shown, or any other CVT structure known in the art or as may be developed. The CVT 1001 may be controlled by CVT controller 1012 in order to control the speed variator 153, e.g., by generating CVT control signals to adjust the relative speed of first application shaft 120 and speed variator shaft 160, wherein the speed of the speed variator shaft 160 is translated to carrier gear 105 as shown.

FIG. 10 furthermore provides a first application shaft 120 coupled between device 180 and a first sun gear of the differential, and a second application shaft 130 coupled between a second sun gear of the differential and application 190. As will be understood from FIG. 1-FIG. 9, the rotation speed and torque of second application shaft 130 may be controlled by adjusting the speed variator 153 to control the relative rotation speeds of first application shaft 120 and carrier gear 105. In some embodiments, a speed sensor 1011 may continuously measure the rotation speed of first application shaft 120. Speed sensor 1011 may continuously provide speed data to CVT controller 1012. CVT controller 1012 may continuously perform calculations according to this disclosure in order to adjust the CVT 1001, to thereby produce a calculated output at second application shaft 130. For example, in some embodiments, CVT controller 1012 may continuously adjust the CVT 1001 to produce a constant rotation speed or constant torque at second application shaft 130, accounting for any changes in rotation speed at first application shaft 120.

In FIG. 10, one variable diameter pulley of the CVT 1001 is on the first application shaft 120, outside of case 1002. Another variable diameter pulley of the CVT 1001 is on the speed variator shaft 160, also outside of case 1002. The first application shaft 120 extends from CVT 1001 through a first opening in the case 1002. The second application shaft 130 extends through a second opening in the case 1002. The speed variator shaft 160 extends from CVT 1001 through a third opening in the case 1002. The speed range gear 170 is positioned inside the case 1002.

The first opening is fitted with a support wall, as shown, which supports first application shaft 120 inside the first opening, and supports the carrier gear 105 on the exterior of the first opening. Support walls may be cylindrical in some embodiments, or may be rectangular or of another shape. The second application shaft 130 extends through a second opening in the case 1002, opposite the first opening. The second opening is also fitted with a support wall, as shown, which supports second application shaft 130 inside the second opening, and supports the differential cage on the exterior of the second opening. The speed variator shaft 160 extends through a third opening in the case 1002, which is located on a same side of case 1002 as the first opening. The third opening is also fitted with a support wall, as shown, which supports speed variator shaft 160 inside the third opening. Various other aspects of the illustrated arrangement, such as relative sizes and positions of the example gears and pulleys, will be apparent from FIG. 10.

In FIG. 10, the speed variator 153 links the first application shaft 120 and carrier gear 105. Furthermore, the arrangement of the speed range gear 170 and the carrier gear 105 is effective to rotate first application shaft 120 and carrier gear 105 in opposite directions. Referring to the first application shaft 120 as shaft A, having a rotation speed $V_A$ and a torque $T_A$, the second application shaft 130 as shaft C, having a rotation speed $V_C$ and a torque $T_C$, and the carrier gear 105 as B, having a rotation speed $V_B$ and a torque $T_B$, the equations for the "second configuration" set forth herein may be used, e.g., at CVT controller 1012, to determine adjustment settings for CVT 1001 in order to produce desired outputs at second application shaft 130, given a known rotation speed $V_A$ at first application shaft 120. Note that the ratio k in the equations set forth herein may be expressed and/or calculated as the product of a gear ratio G (e.g., a gear ratio between carrier gear 105 and speed range gear 170) and a CVT ratio P (e.g., a ratio between the variable diameter pulleys of the CVT 1001).

Any number of modifications may be made to the two channel transmission apparatus of FIG. 10, as will be appreciated. For example, in some embodiments, the speed range gear 170 may meshingly engage with a gear on the second application shaft 130, instead of the carrier gear 105. Meanwhile, the carrier gear 105 may engage with a system input/output gear affixed to a system input/output shaft. In such modified embodiments, the CVT controller 1012 may be modified to calculate modified adjustment settings, as appropriate for the modified embodiment.

Figure 11:
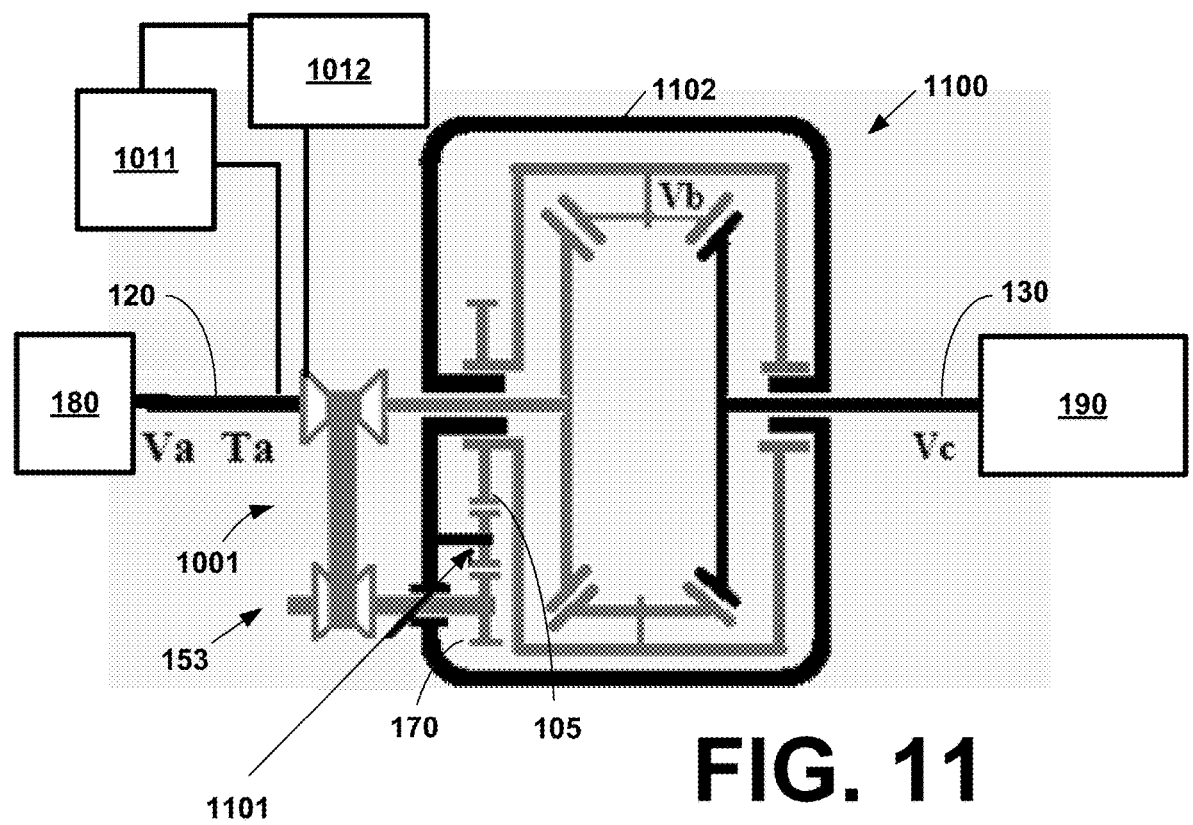
FIG. 11 is schematic diagram of another example two channel transmission apparatus comprising a differential.

FIG. 11 is a schematic diagram of another example two channel transmission apparatus comprising a differential, in accordance with at least some embodiments of the present disclosure. In FIG. 11, like elements introduced in FIG. 1-FIG. 10 are given like identifiers. FIG. 11 includes a two channel transmission apparatus 1100 between device 180 and application 190. Two channel transmission apparatus 1100 is generally similar to two channel transmission apparatus 1000, illustrated in FIG. 10. In addition to the elements described in FIG. 10, two channel transmission apparatus 1100 includes a middle gear 1101 meshingly engaged between the carrier gear 105 and the speed range gear 170, inside of case 1102. Case 1102 includes a gear support, as shown, to support middle gear 1101.

In FIG. 11, the speed variator 153 links the first application shaft 120 and carrier gear 105. Furthermore, the arrangement of the speed range gear 170, middle gear 1101, and the carrier gear 105 is effective to rotate first application shaft 120 and carrier gear 105 in a same direction. Referring to the first application shaft 120 as shaft A, having a rotation speed $V_A$ and a torque $T_A$, the second application shaft 130 as shaft C, having a rotation speed $V_C$ and a torque $T_C$, and the carrier gear 105 as B, having a rotation speed $V_B$ and a torque $T_B$, the equations for the "first configuration" set forth herein may be used, e.g., at CVT controller 1012, to determine adjustment settings for CVT 1001 in order to produce desired outputs at second application shaft 130, given a known rotation speed $V_A$ at first application shaft 120. Note that the ratio k in the equations set forth herein may be expressed and/or calculated as the product of a gear ratio G (e.g., a gear ratio between carrier gear 105, middle gear 1101 and speed range gear 170) and a CVT ratio P (e.g., a ratio between the variable diameter pulleys of the CVT 1001).

Figure 12:
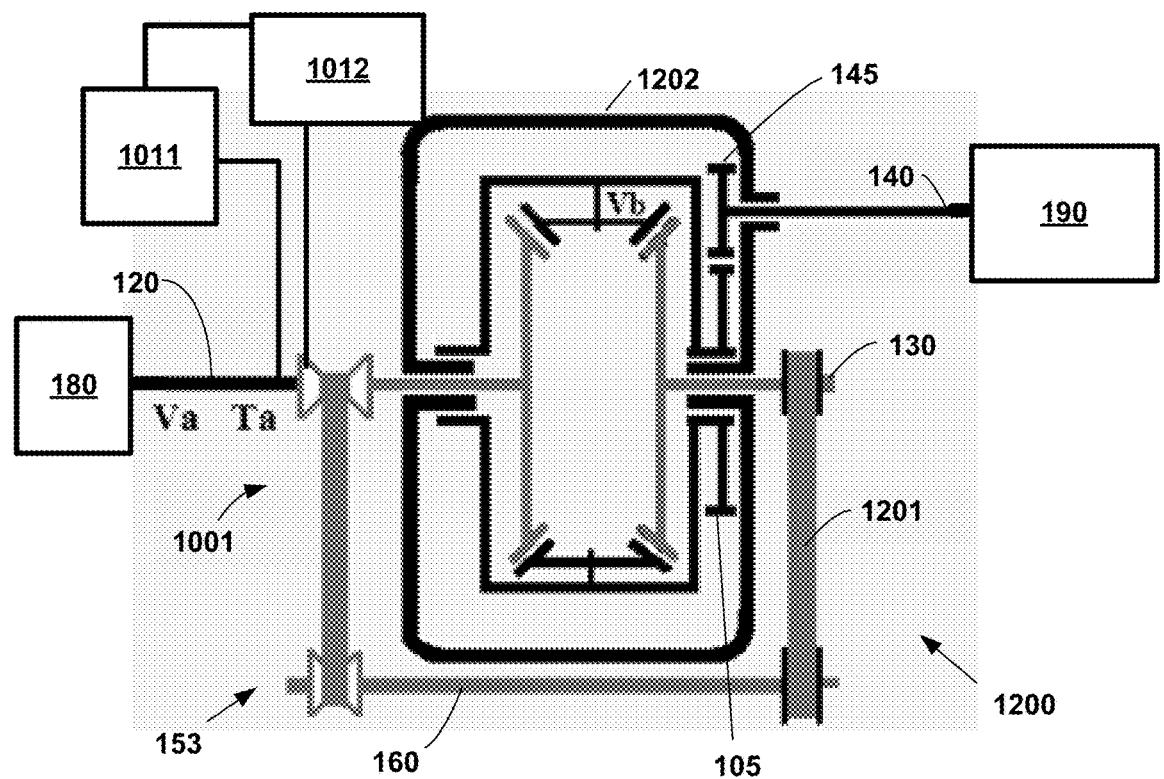
FIG. 12 is a schematic diagram of another example two channel transmission apparatus comprising a differential.

FIG. 12 is a schematic diagram of another example two channel transmission apparatus comprising a differential, in accordance with at least some embodiments of the present disclosure. In FIG. 12, like elements introduced in FIG. 1-FIG. 10 are given like identifiers. FIG. 12 includes a two channel transmission apparatus 1200 between device 180 and application 190. As in FIG. 10, two channel transmission apparatus 1200 comprises, inter alia, a speed variator 153 coupled with a differential. The differential is disposed inside a case 1202, while the speed variator 153 is disposed outside of case 1202.

In some respects, two channel transmission apparatus 1200 in FIG. 12 is similar to two channel transmission apparatus 1000 illustrated in FIG. 10, as will be appreciated. Unlike FIG. 10, however, speed variator 153 in FIG. 12 is disposed entirely outside of case 1202 and links the first application shaft 120 with the second application shaft 130, while a system input/output shaft 140 transmits the output of the two channel transmission apparatus 1200 to application 190.

In FIG. 12, speed variator 153 comprises a belt 1201 coupling speed variator shaft 160 and second application shaft 130, outside of case 1202. Belt 1201 and CVT 1001 are therefore sized to allow speed variator shaft 160 to be positioned outside of case 1202.

In FIG. 12, system input/output shaft 140 is affixed to a system input/output gear 145, disposed inside of case 1202 and meshingly engaged therein with carrier gear 105. System input/output shaft 140 extends through a third opening in case 1202, which third opening is on a same side of case 1202 as the second opening, through which the second application shaft 130 extends.

In FIG. 12, the speed variator 153 links the first application shaft 120 and the second application shaft 130. Furthermore, the arrangement of the CVT 1001, speed variator shaft 160, and the belt 1201 is effective to rotate first application shaft 120 and second application shaft 130 in a same direction. Referring to the first application shaft 120 as shaft A, having a rotation speed $V_A$ and a torque $T_A$, the second application shaft 130 as shaft C, having a rotation speed $V_C$ and a torque $T_C$, and the system input/output shaft 140 as B, having a rotation speed $V_B$ and a torque $T_B$, the equations for the "third configuration" set forth herein may be used, e.g., at CVT controller 1012, to determine adjustment settings for CVT 1001 in order to produce desired outputs at system input/output shaft 140, given a known rotation speed $V_A$ at first application shaft 120. Note that the ratio k in the equations set forth herein may be expressed and/or calculated as the product of a gear ratio G (e.g., a gear ratio between carrier gear 105, and system input/output gear 145, optionally also accounting for a ratio of the pulleys serving belt 1201) and a CVT ratio P (e.g., a ratio between the variable diameter pulleys of the CVT 1001).

Figure 13:
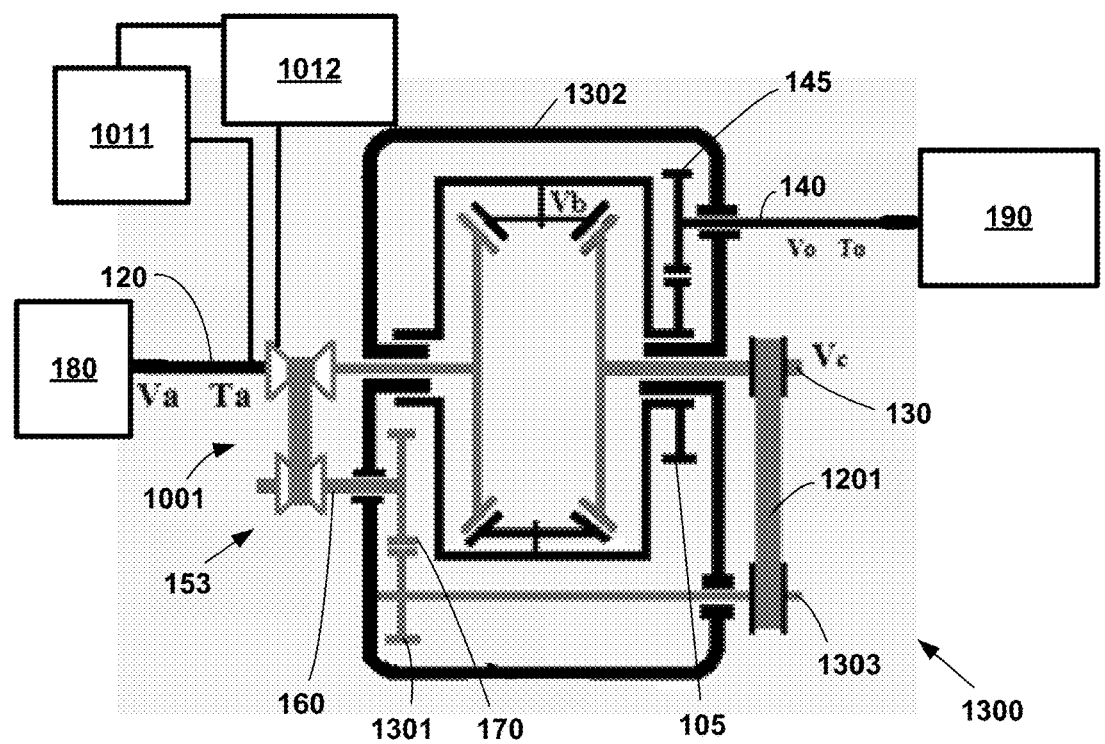
FIG. 13 is a schematic diagram of another example two channel transmission apparatus comprising a differential.

FIG. 13 is a schematic diagram of another example two channel transmission apparatus comprising a differential, in accordance with at least some embodiments of the present disclosure. In FIG. 13, like elements introduced in FIG. 1-FIG. 10 are given like identifiers. FIG. 13 includes a two channel transmission apparatus 1300 between device 180 and application 190. As in FIG. 10, two channel transmission apparatus 1300 comprises, inter alia, a speed variator 153 coupled with a differential. The differential is disposed inside a case 1302. Some elements of speed variator 153 are inside of case 1302, and other elements of speed variator 153 are outside of case 1302.

Two channel transmission apparatus 1300 in FIG. 13 is generally similar to two channel transmission apparatus 1200 illustrated in FIG. 12, as will be appreciated. Unlike FIG. 12, however, speed variator 153 in FIG. 13 is disposed partially inside of case 1302 and includes an additional set of gears.

In FIG. 13, speed variator shaft 153 extends from CVT 1001 through a third opening in case 1302, to a speed range gear 170 disposed inside of case 1302. Speed range gear 170 meshingly engages with a gear 1301. A shaft 1303 extends from a sidewall of case 1302, through gear 1301, through a fourth opening in case 1302, and to a pulley coupled with belt 1201.

In FIG. 13, the speed variator 153 links the first application shaft 120 and the second application shaft 130. Furthermore, the arrangement of the CVT 1001, speed range gear 170, gear 1301, speed variator shaft 160, and belt 1201 is effective to rotate first application shaft 120 and second application shaft 130 in opposite directions. Referring to the first application shaft 120 as shaft A, having a rotation speed $V_A$ and a torque $T_A$, the second application shaft 130 as shaft C, having a rotation speed $V_C$ and a torque $T_C$, and the system input/output shaft 140 as B, having a rotation speed $V_B$ and a torque $T_B$, the equations for the "fourth configuration" set forth herein may be used, e.g., at CVT controller 1012, to determine adjustment settings for CVT 1001 in order to produce desired outputs at system input/output shaft 140, given a known rotation speed $V_A$ at first application shaft 120. Note that the ratio k in the equations set forth herein may be expressed and/or calculated as the product of a gear ratio G (e.g., a gear ratio between carrier gear 105, and system input/output gear 145, optionally also accounting for a ratio of the pulleys serving belt 1201 and a ratio of gears 170 and 1301) and a CVT ratio P (e.g., a ratio between the variable diameter pulleys of the CVT 1001).

Figure 14:
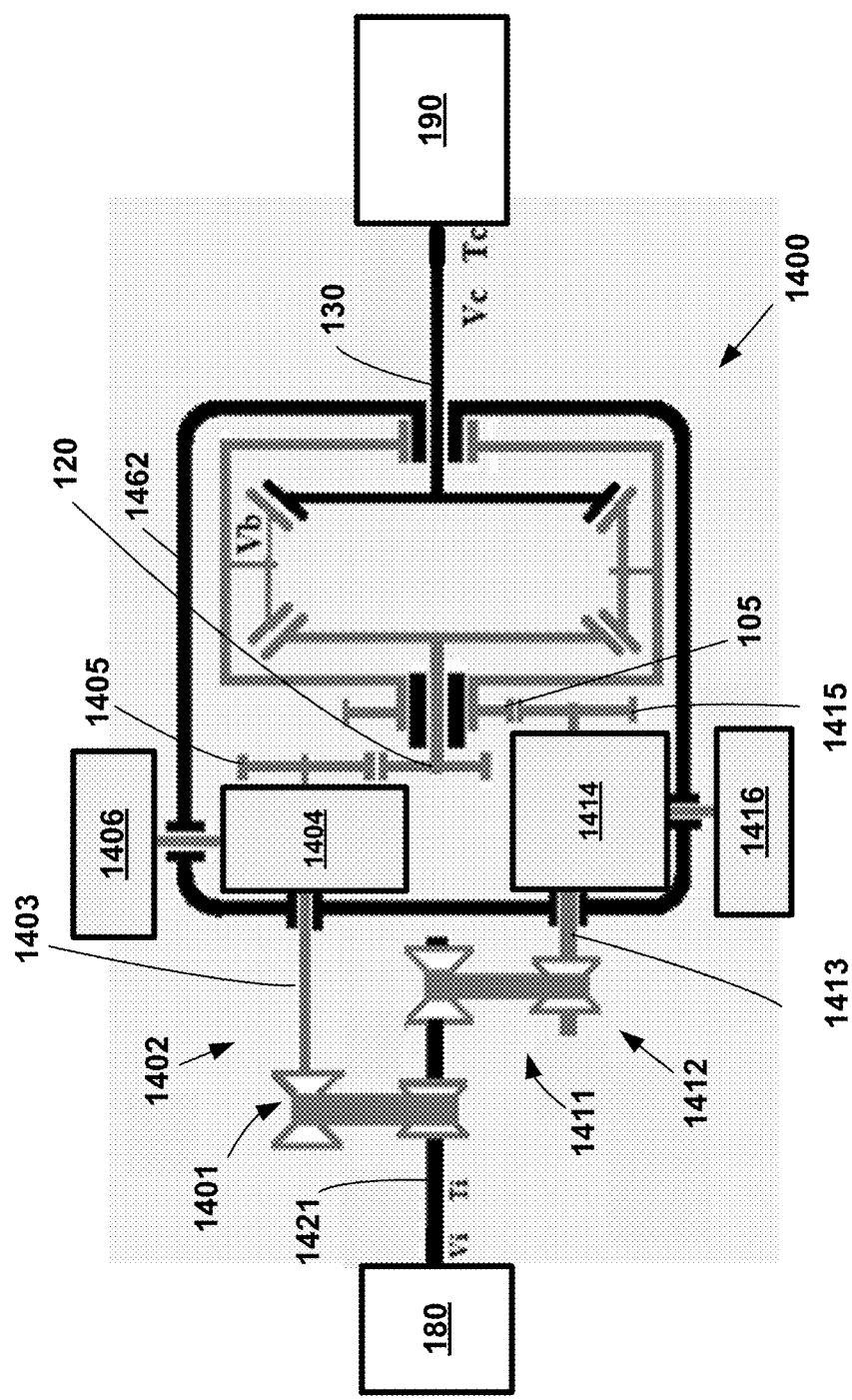
FIG. 14 is a schematic diagram of another example two channel transmission apparatus comprising a differential.

FIG. 14 is a schematic diagram of another example two channel transmission apparatus comprising a differential, in accordance with at least some embodiments of the present disclosure. In FIG. 14, like elements introduced in FIG. 1-FIG. 10 are given like identifiers. FIG. 14 includes a two channel transmission apparatus 1400 between device 180 and application 190. Two channel transmission apparatus 1400 is generally similar to two channel transmission apparatus 1000 illustrated in FIG. 10. In addition to the elements described in FIG. 10, two channel transmission apparatus 1400 includes an additional speed variator and controllable gearboxes to control the relative rotations of linked differential inputs.

FIG. 14 includes a speed variator 1402 and a speed variator 1412. Speed variator 1402 is coupled with shaft 1421 via CVT 1401. A speed variator shaft 1402 extends between CVT 1401 and gearbox 1404. Gearbox 1404 is controlled via controller 1406. A speed range gear 1405 extends from gearbox 1404. Speed range gear 1405 meshingly engages with a gear affixed to first application shaft 120. Note that a speed sensor 1011 and CVT controller 1012 may be used to control CVT 1401, as described herein. CVT 1401 and gearbox 1404 may therefore be used to control relative rotation speeds of shaft 1421 and first application shaft 120.

Speed variator 1412 is coupled with shaft 1421 via CVT 1411. A speed variator shaft 1413 extends between CVT 1411 and gearbox 1414. Gearbox 1414 is controlled via controller 1416. A speed range gear 1415 extends from gearbox 1414. Speed range gear 1415 meshingly engages with carrier gear 105. Note that a speed sensor 1011 and CVT controller 1012 may be used to control CVT 1411, as described herein. CVT 1411 and gearbox 1414 may therefore be used to control relative rotation speeds of shaft 1421 and carrier gear 105.

In FIG. 14, the speed variator 1413 links the first application shaft 120 and the carrier gear 105. Depending upon the arrangement of gearboxes 1404 and 1414, two channel transmission apparatus 1400 may rotate first application shaft 120 and carrier gear 105 in the same direction, or in opposite directions. Thus the equations for the "first configuration" or the "second configuration" set forth herein may be used, e.g., at CVT controller 1012, to determine adjustment settings for CVT 1001 in order to produce desired outputs at second application shaft 130, given a known rotation speed $V_A$ at shaft 1421. Note that the rotation speed $V_A$ at first application shaft 120 may be derived from gear ratio $G_1$ (e.g., a gear ratio produced by gearbox 1404, speed range gear 1405 and the gear meshingly engaged with speed range gear 1405) and carrier gear 105 a CVT ratio $P_1$ (e.g., a ratio between the variable diameter pulleys of the CVT 1401); and the ratio k in the equations set forth herein may be expressed and/or calculated as the product of a gear ratio $G_2$ (e.g., a gear ratio produced by gearbox 1414, speed range gear 1415 and carrier gear 105) and a CVT ratio $P_2$ (e.g., a ratio between the variable diameter pulleys of the CVT 1411).

Figure 15:
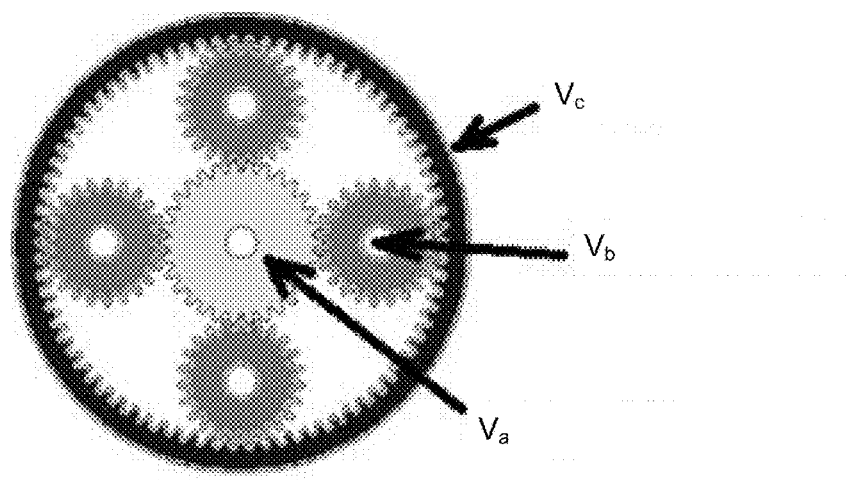
FIG. 15 illustrates an example epicyclic gear train, such as may be included in FIG. 16-FIG. 19.

FIG. 15 illustrates an example epicyclic gear train, such as may be included in FIG. 16-FIG. 19. FIG. 15 illustrates a sun gear, planet gears, and a ring gear. A carrier may form a rigid link between the centers of the planet gears, and such carrier may optionally be coupled with a carrier gear. It will be understood that the planet gears may optionally be thereby coupled (via the carrier) with an epicyclic input/output, e.g., an input/output shaft B, having a rotation speed $V_B$ and a torque $T_B$. The sun gear may also optionally be coupled with an epicyclic input/output, e.g., an input/output shaft A, having a rotation speed $V_A$ and a torque $T_A$. The ring gear may also optionally be coupled with an epicyclic input/output, e.g., an input/output shaft C, having a rotation speed $V_C$ and a torque $T_C$.

Figure 16:
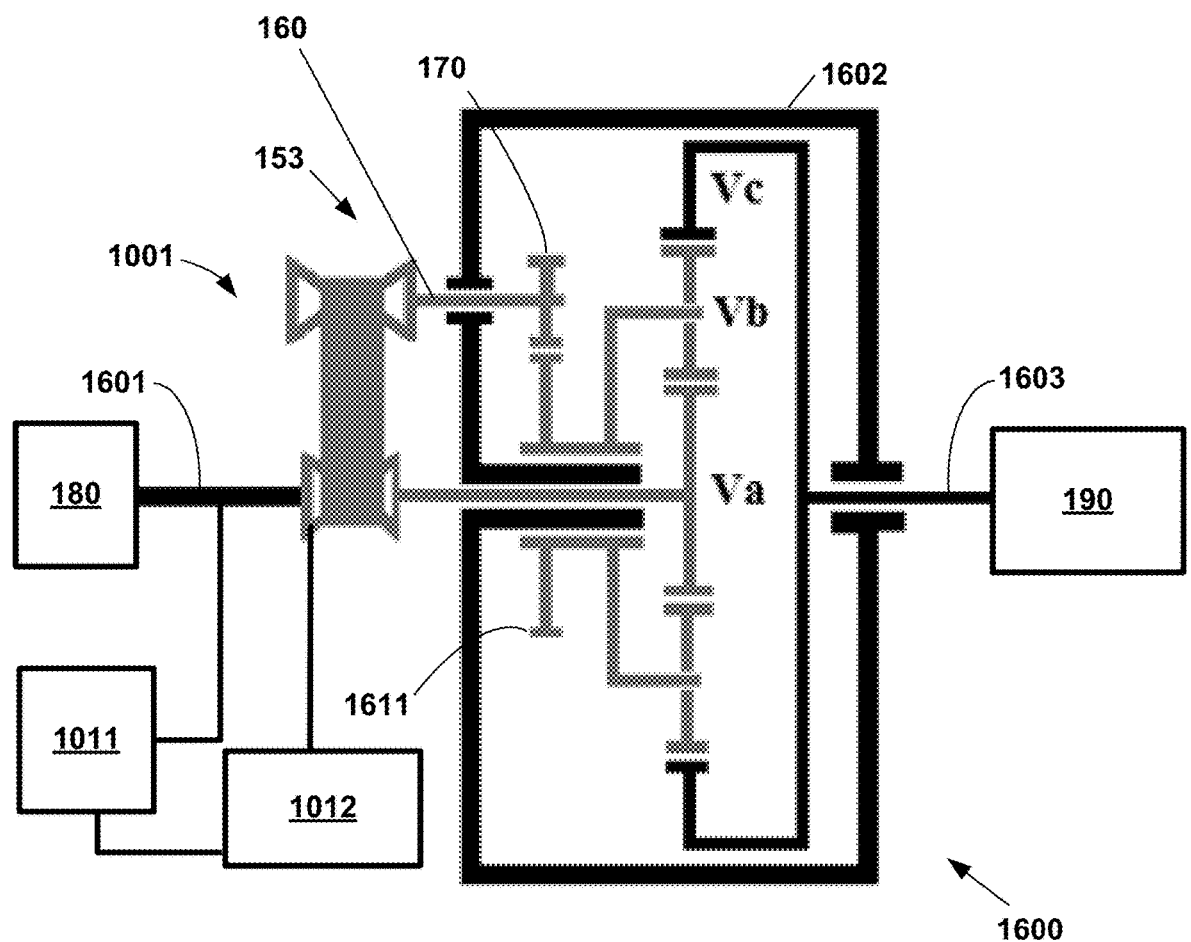
FIG. 16 is a schematic diagram of an example two channel transmission apparatus comprising an epicyclic gear train.

FIG. 16 is a schematic diagram of an example two channel transmission apparatus comprising an epicyclic gear train, in accordance with at least some embodiments of the present disclosure. In FIG. 16, like elements introduced in FIG. 1-FIG. 10 are given like identifiers. FIG. 16 includes a two channel transmission apparatus 1600 between device 180 and application 190. Two channel transmission apparatus 1600 comprises, inter alia, a speed variator 153 coupled with an epicyclic gear train. The epicyclic gear train is disposed inside a case 1602. Some elements of speed variator 153 are inside of case 1602, and other elements of speed variator 153 are outside of case 1602.

In FIG. 16, the elements of the epicyclic gear train will be understood from FIG. 15, and generally speaking, the operation of such elements will be understood by analogy to the differential technologies disclosed herein. One difference between the differential and the epicyclic is the number of possible positions of the CVT 1001. For embodiments including a differential, the CVT 1001 can be in two positions-between shafts A and B or A and C (B and C is the same as A and B). For embodiments including an epicyclic, the CVT 1001 can be in three positions (between shafts A and B, A and C, or B and C).

In FIG. 16, the epicyclic gear train includes a sun gear having a rotation speed $V_A$, planet gears having a rotation speed $V_B$ and coupled with a carrier gear 1611, and a ring gear having a rotation speed $V_C$. The carrier gear 1611 is illustrated to one side of the epicyclic gear train as shown. Likewise, the elements of the speed variator 153 will be understood from FIG. 1-FIG. 10. The speed variator 153 includes a CVT 1001, a speed variator shaft 160, and a speed range gear 170. The speed range gear 170 is meshingly engaged with the carrier gear 1611 of the epicyclic gear train inside of case 1602. The CVT 1001 may be controlled by CVT controller 1012 in order to control the speed variator 153, e.g., by generating CVT control signals to adjust the relative speed of first application shaft 1601 and speed variator shaft 160.

FIG. 16 furthermore provides a first application shaft 1601 coupled between device 180 and the sun gear of the epicyclic gear train, and a second application shaft 1603 coupled between the ring gear of the epicyclic gear train and application 190. As will be understood from FIG. 1-FIG. 9, the rotation speed and torque of second application shaft 1603 may be controlled by adjusting the speed variator 153 to control the relative rotation speeds of first application shaft 1601 and carrier gear 1611. In some embodiments, a speed sensor 1011 may continuously measure the rotation speed of first application shaft 1601. Speed sensor 1011 may continuously provide speed data to CVT controller 1012. CVT controller 1012 may continuously perform calculations according to this disclosure in order to adjust the CVT 1001 to produce a calculated output at second application shaft 1603. For example, in some embodiments, CVT controller 1012 may continuously adjust the CVT 1001 to produce a constant rotation speed at second application shaft 1603, accounting for any changes in rotation speed at first application shaft 1601.

In FIG. 16, one variable diameter pulley of the CVT 1001 is on the first application shaft 1601, outside of case 1602. Another variable diameter pulley of the CVT 1001 is on the speed variator shaft 160, also outside of case 1602. The first application shaft 1601 extends from CVT 1001 through a first opening in the case 1602. The second application shaft 1603 extends through a second opening in the case 1602. The speed variator shaft 160 extends from CVT 1001 through a third opening in the case 1602. The speed range gear 170 is positioned inside the case 1602.

The first opening in case 1602 is fitted with a support wall, as shown, which supports first application shaft 1601 inside the support wall, and supports the carrier gear 1611 on the exterior of the support wall. The second application shaft 1603 extends through a second opening in the case 1602, opposite the first opening. The second opening is also fitted with a support wall, as shown, which supports second application shaft 1603 inside the support wall. The speed variator shaft 160 extends through a third opening in the case 1602, which is located on a same side of case 1602 as the first opening. The third opening is also fitted with a support wall, as shown, which supports speed variator shaft 160 inside the third opening. Various other aspects of the illustrated arrangement, such as example gear and pulley relative sizes and positions, will be apparent from FIG. 16.

In FIG. 16, the speed variator 153 links the first application shaft 1601 and carrier gear 1611. Furthermore, the arrangement of the speed range gear 170 and the carrier gear 1611 is effective to rotate first application shaft 1601 and carrier gear 1611 in opposite directions. Referring to the first application shaft 1601 as shaft A, having a rotation speed $V_A$ and a torque $T_A$, the second application shaft 1603 as shaft C, having a rotation speed $V_C$ and a torque $T_C$, and the carrier gear 1611 as B, having a rotation speed $V_B$ and a torque $T_B$, the equations for the "second configuration" set forth herein may be used, e.g., at CVT controller 1012, to determine adjustment settings for CVT 1001 in order to produce desired outputs at second application shaft 1603, given a known rotation speed $V_A$ at first application shaft 1601. Note that the ratio k in the equations set forth herein may be expressed and/or calculated as the product of a gear ratio G (e.g., a gear ratio between carrier gear 1611 and speed range gear 170) and a CVT ratio P (e.g., a ratio between the variable diameter pulleys of the CVT 1001).

FIG. 16 illustrates an example two channel transmission apparatus, comprising: at least three gears A, B, and C meshingly engaged with one another and rotating around a same axis such that $V_A + V_C = 2V_B$. Gear A may comprise, e.g., the sun gear, while gear C may comprise the ring gear, and gear B may comprise the planet gear(s). Gears A, B, and C are disposed inside of case 1602. A first input/output shaft 1601 affixed to gear A extends out of the case 1602 via a first opening in the case 1602. A second input/output shaft 1603 affixed to gear C extends out of the case 1602 via a second opening in the case 1602. A speed variator 153 comprises at least a CVT 1001, a speed variator shaft 160, and a speed range gear 170. The CVT 1001 is coupled with one of the input/output shafts 1601 outside the case 1602, the speed variator shaft 160 extends from the CVT 1001 into the case 1602 to the speed range gear 170 via a third opening in the case 1602, and the speed range gear 170 is inside the case 1602 and is meshingly engaged with a carrier gear 1611 affixed to gear B of said three gears.

Figure 17:
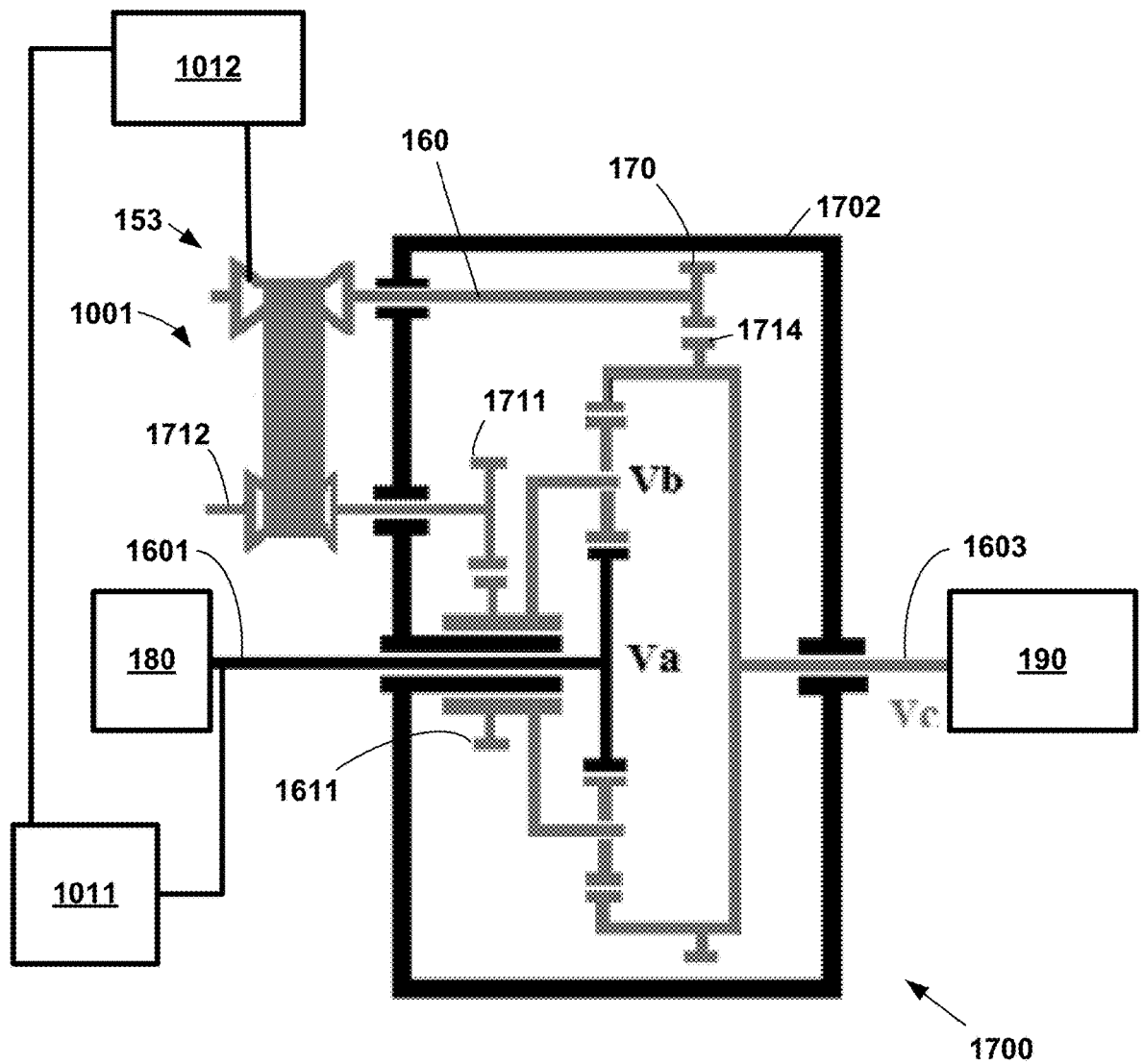
FIG. 17 is a schematic diagram of an example two channel transmission apparatus comprising an epicyclic gear train.

FIG. 17 is a schematic diagram of an example two channel transmission apparatus comprising an epicyclic gear train, in accordance with at least some embodiments of the present disclosure. In FIG. 17, like elements introduced in FIG. 16 are given like identifiers. FIG. 17 includes a two channel transmission apparatus 1700 between device 180 and application 190. Two channel transmission apparatus 1700 comprises, inter alia, a speed variator 153 coupled with an epicyclic gear train. The epicyclic gear train is disposed inside a case 1702. Some elements of speed variator 153 are inside of case 1702, and other elements of speed variator 153 are outside of case 1702.

In FIG. 17, the epicyclic gear train includes a sun gear having a rotation speed $V_A$, planet gears having a rotation speed $V_B$ and coupled with a carrier gear 1611, and a ring gear having a rotation speed $V_C$. The carrier gear 1611 is illustrated to one side of the epicyclic gear train as shown.

Likewise, the elements of the speed variator 153 will be understood from FIG. 1-FIG. 9. The speed variator 153 includes a first shaft 1712 extending through case 1702 and coupling CVT 1001 with a gear 1711 which is meshingly engaged with carrier gear 1611. The speed variator 153 furthermore includes CVT 1001, a speed variator shaft 160, and a speed range gear 170. The speed range gear 170 is meshingly engaged with a gear 1714 on the ring gear of the epicyclic gear train. The CVT 1001 may be controlled by a CVT controller 1012 (such as illustrated in FIG. 16) in order to control the speed variator 153, e.g., by generating CVT control signals to adjust the relative speed of shaft 1712 and speed variator shaft 160.

FIG. 17 furthermore provides a first application shaft 1601 coupled between device 180 and the sun gear of the epicyclic gear train, and a second application shaft 1603 coupled between the ring gear of the epicyclic gear train and application 190. As will be understood from FIG. 1-FIG. 9, the rotation speed and torque of second application shaft 1603 may be controlled by adjusting the speed variator 153 to control the relative rotation speeds of the ring gear and carrier gear 1611.

In FIG. 17, the first application shaft 1601 extends from device 180 through a first opening in the case 1702. The second application shaft 1603 extends through a second opening in the case 1702. The shaft 1712 extends from CVT 1001 through a third opening in the case 1702, and the speed variator shaft 160 extends from CVT 1001 through a fourth opening in the case 1702. The CVT 1001 is positioned outside of case 1702 while the gears 1711 and 170 are positioned inside the case 1702. The openings in case 1702 comprise support walls, as shown and as described with reference to FIG. 16.

In FIG. 17, the speed variator 153 links the second application shaft 1603 (via the ring gear) and the carrier gear 1611. Furthermore, the arrangement of the gears 1611, 1711, 1714, and 170 is effective to rotate second application shaft 1603 and carrier gear 1611 in the same direction. Referring to the first application shaft 1601 as shaft A, having a rotation speed $V_A$ and a torque $T_A$, the second application shaft 1603 as shaft C, having a rotation speed $V_C$ and a torque $T_C$, and the carrier gear 1611 as B, having a rotation speed $V_B$ and a torque $T_B$, the equations for the "first configuration" set forth herein may be used, e.g., at CVT controller 1012, to determine adjustment settings for CVT 1001 in order to produce desired outputs at second application shaft 1603, given a known rotation speed $V_A$ at first application shaft 1601. Also, the ratio k in the equations set forth herein may be expressed and/or calculated as the product of a gear ratio G (e.g., a gear ratio between carrier gear 1611 and gear 1711, and speed range gear 170 and gear 1714) and a CVT ratio P (e.g., a ratio between the variable diameter pulleys of the CVT 1001).

Figure 18:
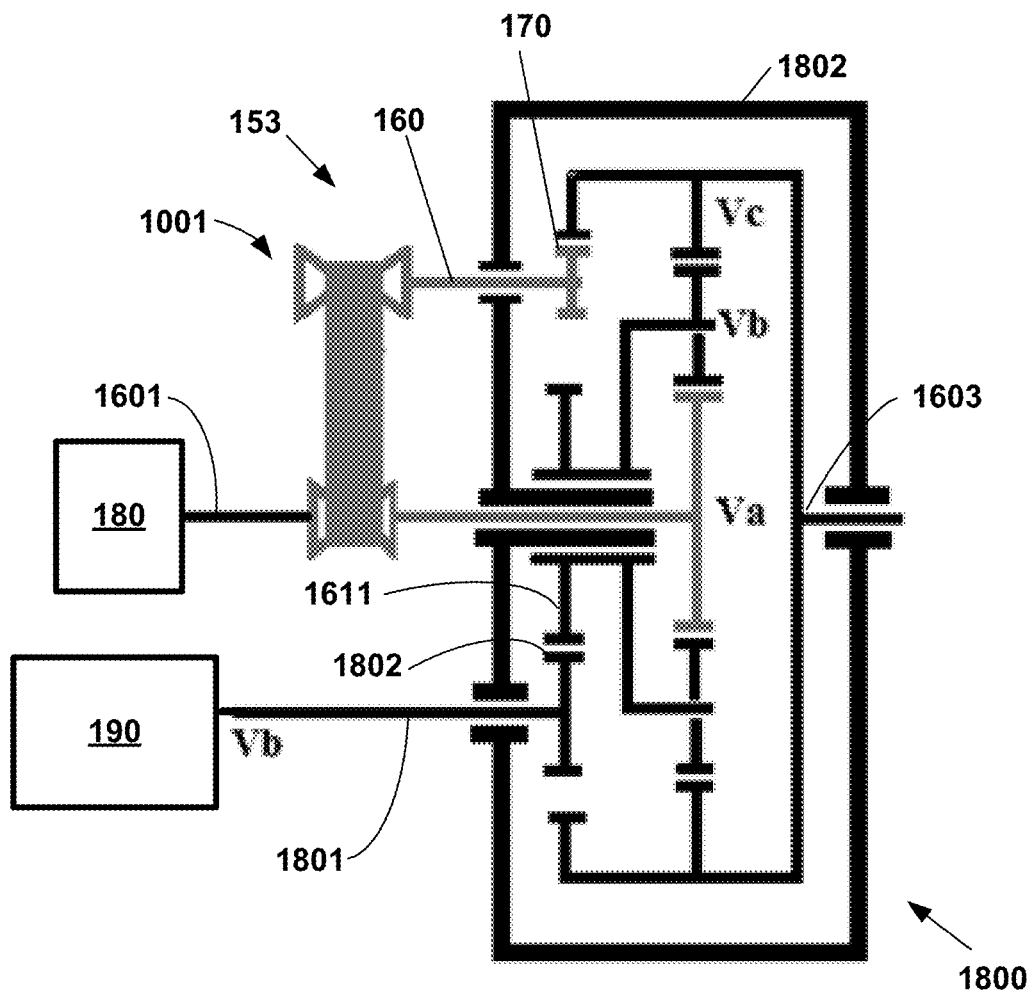
FIG. 18 is a schematic diagram of an example two channel transmission apparatus comprising an epicyclic gear train.

FIG. 18 is a schematic diagram of an example two channel transmission apparatus comprising an epicyclic gear train, in accordance with at least some embodiments of the present disclosure. In FIG. 18, like elements introduced in FIG. 16 are given like identifiers. FIG. 18 includes a two channel transmission apparatus 1800 between device 180 and application 190. Two channel transmission apparatus 1800 comprises, inter alia, a speed variator 153 coupled with an epicyclic gear train. The epicyclic gear train is disposed inside a case 1802. Some elements of speed variator 153 are inside of case 1802, and other elements of speed variator 153 are outside of case 1802.

In FIG. 18, the epicyclic gear train includes a sun gear having a rotation speed $V_A$, planet gears having a rotation speed $V_B$ and coupled with a carrier gear 1611, and a ring gear having a rotation speed $V_C$. The carrier gear 1611 is illustrated to one side of the epicyclic gear train as shown. Likewise, the elements of the speed variator 153 will be understood from FIG. 1-FIG. 9. The speed variator 153 includes a CVT 1001, a speed variator shaft 160, and a speed range gear 170. The speed range gear 170 is meshingly engaged with a gear affixed to the ring gear of the epicyclic gear train inside of case 1802. The CVT 1001 may be controlled by CVT controller 1012 (illustrated in FIG. 16) in order to control the speed variator 153, e.g., by generating CVT control signals to adjust the relative speed of first application shaft 1601 and speed variator shaft 160.

FIG. 18 furthermore provides a first application shaft 1601 coupled between device 180 and the sun gear of the epicyclic gear train, a second application shaft 1603 coupled between the ring gear of the epicyclic gear train and a sidewall of case 1802, and a gear 1802 coupled with carrier gear 1611, wherein gear 1802 is affixed to a shaft 1801 extending to application 190. As will be understood from FIG. 1-FIG. 9, the rotation speed and torque of shaft 1801 may be controlled by adjusting the speed variator 153 to control the relative rotation speeds of the first application shaft 1601 and the ring gear (and second application shaft 1603).

In FIG. 18, the first application shaft 1601 extends from device 180 through a first opening in the case 1802. The second application shaft 1603 extends to a second opening in the case 1802 (or optionally to an attachment point on the sidewall of case 1802). The speed variator shaft 160 extends from CVT 1001 through a third opening in the case 1802, and the shaft 1801 extends from application 190 through a fourth opening in the case 1802. The CVT 1001 is positioned outside of case 1802 while the speed range gear 170 gears 1711 is positioned inside the case 1802. The openings in case 1802 comprise cylindrical support walls, as shown and as described with reference to FIG. 16.

In FIG. 18, the speed variator 153 links the first application shaft 1601 and the second application shaft 1603 (via the ring gear). Furthermore, the arrangement of the speed range gear 170 is effective to rotate first application shaft 1601 and second application shaft 1603 in the same direction. Referring to the first application shaft 1601 as shaft A, having a rotation speed $V_A$ and a torque $T_A$, the second application shaft 1603 as shaft C, having a rotation speed $V_C$ and a torque $T_C$, and the carrier gear 1611 as B, having a rotation speed $V_B$ and a torque $T_B$, the equations for the "third configuration" set forth herein may be used, e.g., at CVT controller 1012, to determine adjustment settings for CVT 1001 in order to produce desired outputs at shaft 1801, given a known rotation speed $V_A$ at first application shaft 1601. Also, the ratio k in the equations set forth herein may be expressed and/or calculated as the product of a gear ratio G (e.g., a gear ratio between carrier gear 1611 and gear 1902, and speed range gear 170 and ring gear) and a CVT ratio P (e.g., a ratio between the variable diameter pulleys of the CVT 1001).

FIG. 18 illustrates an example two channel transmission apparatus, comprising: at least three gears A, B, and C meshingly engaged with one another and rotating around a same axis such that $V_A + V_C = 2V_B$. Gear A may comprise, e.g., the sun gear, while gear C may comprise the ring gear, and gear B may comprise the planet gear(s). Gears A, B, and C are disposed inside of case 1802. A first input/output shaft 1601 affixed to gear A extends out of the case 1802 via a first opening in the case 1802. A second input/output shaft 1603 affixed to gear C extends out of the case 1802 via a second opening in the case 1802. A speed variator 153 comprises at least a CVT 1001, a speed variator shaft 160, and a speed range gear 170. The CVT 1001 is coupled with one of the input/output shafts 1601 outside the case 1802, the speed variator shaft 160 extends from the CVT 1001 into the case 1802 to the speed range gear 170 via a third opening in the case 1802, and the speed range gear 170 is inside the case 1802 and is meshingly engaged with a gear affixed to the ring gear C, which is in turn affixed to one of the input/output shafts 1603 of said three gears.

Figure 19:
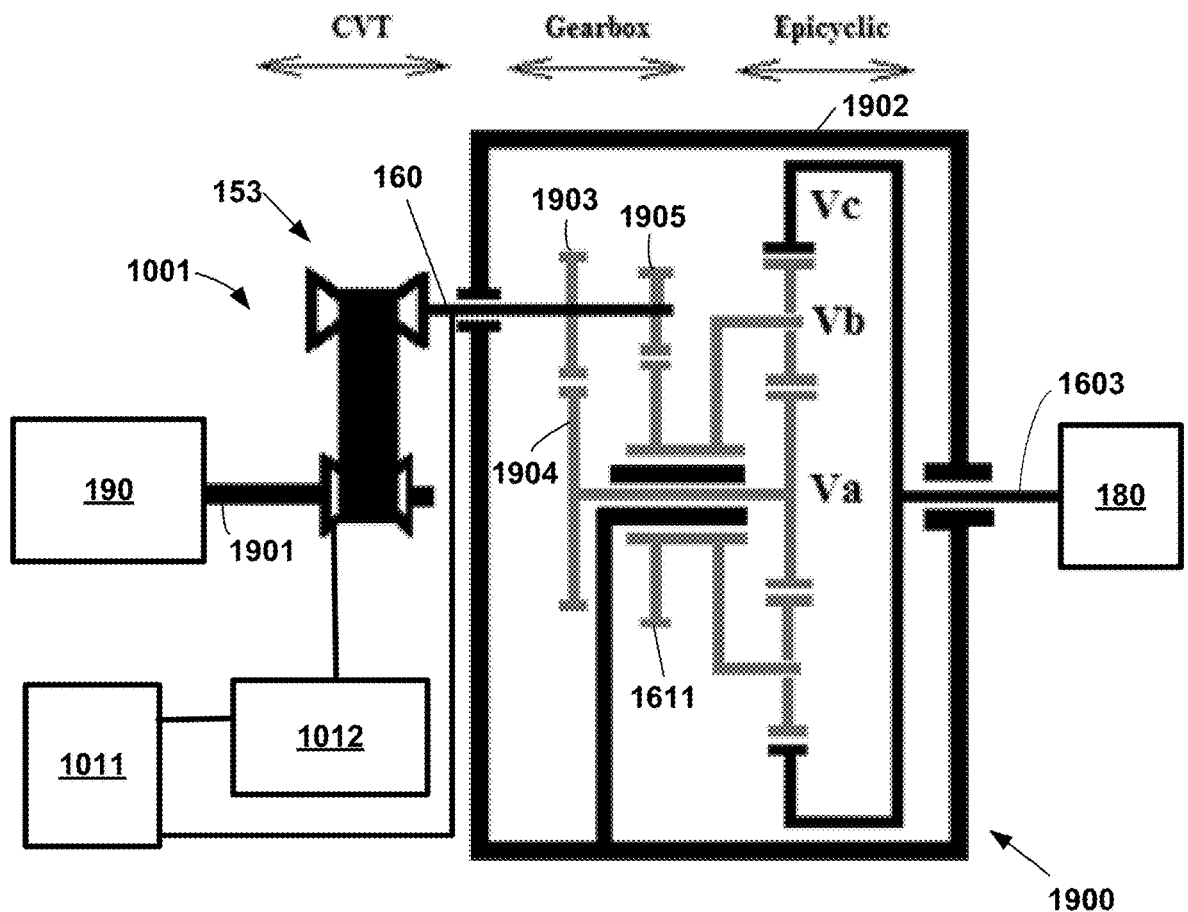
FIG. 19 is a schematic diagram of an example two channel transmission apparatus comprising an epicyclic gear train.

FIG. 19 is a schematic diagram of an example two channel transmission apparatus comprising an epicyclic gear train, in accordance with at least some embodiments of the present disclosure. In FIG. 19, like elements introduced in FIG. 16 are given like identifiers. FIG. 19 includes a two channel transmission apparatus 1900 between device 180 and application 190. Two channel transmission apparatus 1900 comprises, inter alia, a speed variator 153 coupled with an epicyclic gear train. The epicyclic gear train is disposed inside a case 1902. Some elements of speed variator 153 are inside of case 1902, and other elements of speed variator 153 are outside of case 1902.

In FIG. 19, the epicyclic gear train includes a sun gear having a rotation speed $V_A$, planet gears having a rotation speed $V_B$ and coupled with a carrier gear 1611, and a ring gear having a rotation speed $V_C$. The carrier gear 1611 is illustrated to one side of the epicyclic gear train as shown. The speed variator 153 includes a CVT 1001, a speed variator shaft 160, and gears 1903 and 1905. The gear 1903 is meshingly engaged with a gear 1904, which is in turn affixed to a shaft which is affixed to the sun gear of the epicyclic gear train inside of case 1902. The gear 1905 is meshingly engaged with carrier gear 1611, which is affixed to planet gears of the epicyclic gear train inside of case 1902. The CVT 1001 may be controlled by CVT controller 1012 in order to control the speed variator 153, e.g., by generating CVT control signals to adjust the relative speed of shaft 1901 and speed variator shaft 160.

FIG. 19 furthermore provides a shaft 1901 coupled between application 190 and the CVT 1001, and a second application shaft 1603 coupled between the ring gear of the epicyclic gear train and a sidewall of case 1902. The rotation speed and torque of shaft 1901 may be controlled by adjusting the speed variator 153.

In FIG. 19, the second application shaft 1603 extends from device 180 through a first opening in the case 1902. The speed variator shaft 160 extends through a second opening in the case 1902. The CVT 1001 is positioned outside of case 1902 while the gears 1903 and 1905 are positioned inside the case 1902. The openings in case 1902 comprise support walls, as shown and as described with reference to FIG. 16.

In FIG. 19, the speed variator 153 links the first application shaft 1601 and the carrier gear 1611. Furthermore, the arrangement of the gears 1903 and 1905 is effective to rotate the gear 1904 carrier gear 1611 in the same direction. Referring to the shaft affixed to gear 1904 as shaft A, having a rotation speed $V_A$ and a torque $T_A$, the second application shaft 1603 as shaft C, having a rotation speed $V_C$ and a torque $T_C$, and the carrier gear 1611 as B, having a rotation speed $V_B$ and a torque $T_B$, the equations for the "first configuration" set forth herein may be used to determine an output at speed variator shaft 160, given an input at shaft 1603. However, because the illustrated configuration does not adjust relative speeds of epicyclic inputs, CVT controller 1012 may simple measure output speed, e.g., at speed sensor 1011, and CVT controller 1012 may calculate settings for CVT 1001 in order to produce desired outputs at shaft 1901, given a known rotation speed at speed variator shaft 160.

In some embodiments, the device 180 as shown in FIG. 19 may comprise a wind turbine, and the application 190 may comprise a generator which converts the rotation of the turbine into electricity. For wind turbine applications, the input from the wind is at very low speed (typically 5 to 25 RPM), and the ratio between input speed $V_C$ and output speed $V_A$ may preferably be very accurate. This can be done through the application of two sets of gears 1903/1904 and 1905/1611, as shown. The CVT 1001 may be used to regulate the input speed $V_A$ of the generator, without any need to switch gears. It will be appreciated that a similar arrangement may be made with a differential in place of the illustrated epicyclic gear train.

In some embodiments, any of the various two channel transmission apparatus described herein may alternatively apply, e.g., at CVT controller 1012, one or more of the below equations in order to calculate desired CVT 1001 settings. In the below equations, G denotes a gear ratio, and P denotes a CVT ratio:

| Input | CVT between | Output | |
|---|---|---|---|
| shaft A | A and B | shaft C | Voutput = Vinput (2PG − 1) |
| Input | CVT between | Output | |
| shaft A | A and C | shaft B | Voutput = Vinput G (1 + PG)/2 |
| Input | CVT between | Output | |
| shaft A | B and C | shaft C | Voutput = Vinput PG/(2 − PG) |
| (epicyclic) | (epicyclic) | (epicyclic) | |

It will be appreciated that the first row of the above table refers to an arrangement such as illustrated in FIG. 10 and FIG. 19. The second row of the above table refers to an arrangement such as illustrated in FIG. 13 and FIG. 18. The third row of the above table refers to an arrangement such as illustrated in FIG. 17.

Figure 20:
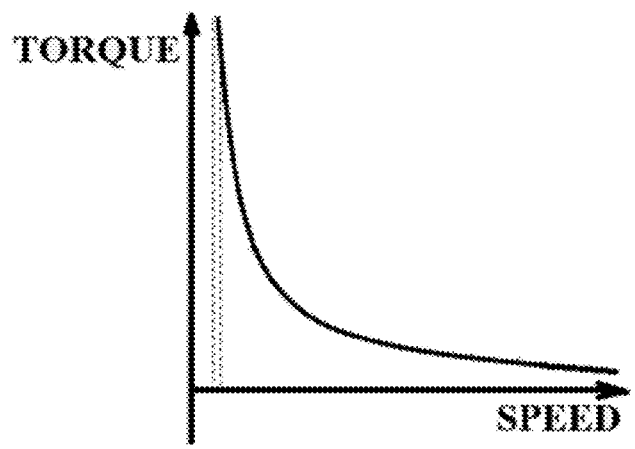
FIG. 20 is an example graph of torque versus speed.

FIG. 20 is an example graph of torque versus speed. In some applications the speed ratio between input and output may have to be very high, e.g., 100 and above. In these conditions, the speed may be very low and the torque very high, as illustrated in FIG. 20. Such embodiments operate at a point on the Torque/Speed curve that is close to the Y axis. A very small variation in the ratio of the CVT may produce a very high variation of torque. Such embodiments can become unstable. For example, even if the CVT is not used and its ratio is supposed to remain constant, variations in the tension of the belt could make the system unstable. FIG. 21 and FIG. 22 are example high-stability two channel transmission apparatus which present a solution to this instability problem. In FIG. 21 and FIG. 22, the CVT is replaced by a connection using a set of gears (FIG. 21) or a belt (FIG. 22). FIG. 21 and FIG. 22 are reversible and may have very high speed ratios (e.g., 100 to 5000) that cannot be achieved with any gearbox. The speed ratios may be high and stable, but are not variable.

FIG. 21 and FIG. 22 are schematic diagrams of example high-stability two channel transmission apparatus, in accordance with at least some embodiments of the present disclosure. The illustrated high-stability two channel transmission apparatus include many similar components, and operate according to similar principles, as technologies previously disclosed herein. Unlike the differential output control and two channel transmission technologies disclosed above, however, the high-stability two channel transmission apparatus of FIG. 21 and FIG. 22 do not allow for adjustment of output speed or torque at a constant input speed or torque. Instead, the high-stability two channel transmission apparatus of FIG. 21 and FIG. 22 produce a constant output speed or torque at any given input speed or torque. However, high-stability two channel transmission apparatus can achieve high speed ratios and high stability, as described in further detail below.

FIG. 21 includes a high-stability (HS) two channel transmission apparatus 2100 between device 180 and application 190. High-stability two channel transmission apparatus 2100 comprises, inter alia, a set of gears R1, R2, R3, and R4 coupled with a differential. The differential and the set of gears are disposed inside a case 2102.

In FIG. 21, the elements of the differential will be understood from FIG. 1-FIG. 9. The differential includes sun gears, planet gears, and a cage with a carrier gear R4. The carrier gear R4 is illustrated to one side of the differential as shown.

FIG. 21 furthermore provides a first shaft 2101 coupled between device 180 and a first sun gear of the differential. A second shaft 2103 is coupled between a second sun gear of the differential and gear R2. The gear R2 and the carrier gear R4 are arranged in parallel planes. The gears R3 and R1 are also arranged in parallel planes, and gears R3 and R1 are meshingly engaged with gears R4 and R2, respectively. A third shaft 2104 is coupled between gears R3, R1, and application 190.

In FIG. 21, the first shaft 2101 extends from device 180 through a first opening in the case 2102. The third shaft 2104 extends through a second opening in the case 2102. The case 2102 may optionally be filled with oil or other lubricant. The first and second openings in the case 2102 may be fitted with support walls, as shown, which support the shafts 2101 and 2104 inside the openings. Support walls may be cylindrical in some embodiments, or may be rectangular or of another shape. In some embodiments, openings in the case 2102 may comprise seals which allow rotation of shafts 2101 and 2104 while preventing leakage of lubricant fluids inside the case 2102.

The second shaft 2103 extends through a support structure 2105 disposed inside the case 2102, as shown. FIG. 21 is a cross sectional view: the support structure 2105 may comprise a cylinder and a brace. The second shaft 2103 extends through the cylinder portion, while the carrier gear R4 may encircle the exterior of the cylinder portion, as shown. The brace may connect the cylinder to the case 2102 body, holding the cylinder rigidly in place. Various other aspects of the illustrated arrangement, such as relative sizes and positions of the example gears, will be apparent from FIG. 21, and may vary across different embodiments as will be appreciated.

In FIG. 21, the high-stability two channel transmission apparatus 2100 links the first shaft 2101 and the third shaft 2104. The relationship between the rotational speeds of the first shaft 2101 and the third shaft 2104 may be expressed by the below equations, wherein:

the first shaft 2101 is referred to as shaft C, having a rotation speed $V_C$, also referred to as $V_{slow}$ the second shaft 2103 is referred to as shaft A, having a rotation speed $V_A$ the third shaft 2104 is referred to as the "high" shaft, having a rotation speed $V_{high}$ the rotation speed of the carrier gear R4 is referred to as $V_B$ the variables R1, R2, R3, and R4 represent either number of teeth or diameters of gears R1, R2, R3, and R4, respectively.

The below equations represent the relationship between the rotational speeds of the shafts illustrated in FIG. 21:

$V_A + V_C = 2V_B$ $V_A = V_{high} R1/R2$ $V_B = V_{high} R3/R4$ $V_C = 2V_B - V_A = V_{high}(2 R3/R4 - R1/R2)$ $V_{slow} = V_{high}(2R3\ R2 - R1\ R4)/R2\ R4$ The speed ratio between input shaft 2101 and output shaft 2104 is therefore fixed but can be anything between 1 and more than 1300. This is way above any ratio that can be achieved with a gearbox. The same number of gears can be used to produce any ratio by changing R1-R2 and R3-R4. Below is a table of example speed ratios that may be produced using different example gear tooth counts or gear diameters.

| Speed Ratio | 5 | 12 | 62 | 165 | 341 | 620 | 1395 |
|---|---|---|---|---|---|---|---|
| R1 | 52 | 45 | 50 | 53 | 45 | 49 | 51 |
| R2 | 20 | 20 | 20 | 30 | 31 | 20 | 31 |
| R3 | 42 | 35 | 39 | 38 | 32 | 38 | 37 |
| R4 | 30 | 30 | 31 | 45 | 44 | 31 | 45 |

Any number of modifications may be made to high-stability two channel transmission apparatus of FIG. 21, as will be appreciated. For example, in some embodiments, an epicyclic may be used instead of a differential. And of course the gear ratios of R3/R4 and R1/R2 may be adjusted. The gears R1, R2, R3, and R4 may be positioned or arranged differently. In some embodiments, additional intermediate gears may be positioned between R3/R4 and R1/R2.

FIG. 22 illustrates another example high-stability (HS) two channel transmission apparatus 2200. Differential speed conversion device 2200 may be positioned between device 180 and application 190. High-stability two channel transmission apparatus 2200 comprises, inter alia, a set of pulleys P1, P2, P3, and P4 coupled with a differential. The differential is disposed inside a case 2202, and the pulleys P1, P2, P3, and P4 are disposed outside the case 2202. In FIG. 22, pulleys P1, P2, P3, and P4 replace the gears R1, R2, R3, and R4 in FIG. 21.

In FIG. 22, the elements of the differential will be understood from FIG. 1-FIG. 9. The differential includes sun gears, planet gears, and a cage with a carrier gear. The carrier gear is fitted with a pulley P4 in place of a gear. The pulley P4 is illustrated to one side of the differential and outside the case 2202 as shown.

FIG. 22 furthermore provides a first shaft 2201 coupled between device 180 and a first sun gear of the differential. A second shaft 2203 is coupled between a second sun gear of the differential and pulley P2. The pulley P2 and the pulley P4 are arranged in parallel planes. The pulleys P3 and P1 are also arranged in parallel planes, and pulleys P3 and P1 are connected with pulleys P4 and P2, respectively, via belts 2205. A third shaft 2204 is coupled between pulleys P3, P1 and application 190.

In FIG. 22, the first shaft 2201 extends from device 180 through a first opening in the case 2202. A carrier gear coupling structure 2206 extends through a second opening in the case 2202. The carrier gear coupling structure 2206 may comprise a cylinder. The second shaft 2203 extends through the carrier gear coupling structure 2206. The case 2202 may optionally be filled with oil or other lubricant. The first and second openings in the case 2202 may be fitted with support walls, as shown, which support the shaft 2201 and the carrier gear coupling structure 2206. Support walls may be cylindrical in some embodiments, or may be rectangular or of another shape. In some embodiments, openings in the case 2202 may comprise seals which allow rotation of shaft 2201 and carrier gear coupling structure 2206, while preventing leakage of lubricant fluids inside the case 2202. Various other aspects of the illustrated arrangement, such as relative sizes and positions of the example pulleys, will be apparent from FIG. 22, and may vary across different embodiments as will be appreciated.

In FIG. 22, the high-stability two channel transmission apparatus 2200 links the first shaft 2201 and the third shaft 2204. The relationship between the rotational speeds of the shafts illustrated in FIG. 22 are identical to those set forth for FIG. 21, except that P1, P2, P3, and P4 may be used in place of R1, R2, R3, and R4, where P1, P2, P3, and P4 represent the diameters of pulleys P1, P2, P3, and P4.

In embodiments according to FIG. 21, there is a requirement that R1+R2=R3+R4, in order to allow the gear sets to engage at a same distance from one another. This requirement is removed in embodiments according to FIG. 22, by employing pulleys and belts 2205 in place of gears. As a result, there are many additional options for values of P1, P2, P3, and P4.

In FIG. 22, as with FIG. 21, the speed ratio between input shaft 2201 and output shaft 2204 is fixed. Depending on the arrangement, the speed ratio may fall anywhere in a very large range, e.g., between 1 and 5000. The same number of pulleys can be used to produce any speed ratio, by changing P1, P2, P3, and P4.

It will be appreciated that in some embodiments, an epicyclic may replace the differential in FIGS. 21 and 22. In general, FIG. 21 and FIG. 22 illustrate example high-stability two channel transmission apparatus, including a differential (or epicyclic gear train) disposed inside a case 2102, 2202. A first shaft 2101, 2201 is affixed to a first sun gear of said differential (or epicyclic gear train), the first shaft 2101, 2201 extending out of the case 2102, 2202 via a first opening in the case 2102, 2202. A second shaft 2103, 2203 is affixed, at a proximal end of said second shaft 2103, 2203, to a second sun gear of said differential (or a ring gear of said epicyclic gear train). A gear R2 (FIG. 21) or pulley P2 (FIG. 22) is affixed at a distal end of said second shaft 2103, 2203. A third shaft 2104, 2204 is fitted, at a proximal end thereof, with two gears (R3 and R1) or two pulleys (P3 and P1). In FIG. 21, the third shaft 2104 is fitted with two gears R3 and R1, and the gear R3 meshingly engages with a carrier gear R4 of the differential or epicyclic gear train, while gear R1 meshingly engages with gear R2. In FIG. 22, the third shaft 2204 is fitted with two pulleys P3 and P1, a first belt 2205 couples pulley P3 with a pulley P4 fitted in place of a carrier gear of said differential or epicyclic gear train, and a second belt 2205 couples pulley P1 with pulley P2. In both FIG. 21 and FIG. 22, a distal end of the third shaft 2104, 2204 is configured to couple with an input or output application 190 of the high-stability two channel transmission apparatus. A distal end of the first shaft 2101, 2201 is likewise configured to couple with an input or output application (referred to as device 180) of the high-stability two channel transmission apparatus.

While various embodiments have been disclosed herein, other aspects and embodiments will be apparent to those skilled in art, with the benefit of this disclosure.

The invention claimed is:

1. A high-stability two channel transmission apparatus, comprising:
   a bevel gear differential disposed inside a case;
   a first shaft affixed to a first sun gear of said bevel gear differential, the first shaft extending out of the case via a first opening in the case;
   a second shaft affixed, at a proximal end of said second shaft, to a second sun gear of said bevel gear differential;
   a gear R2 affixed at a distal end of said second shaft;
   a third shaft fitted, at a proximal end thereof, with two gears R3 and R1, wherein said gear R3 meshingly engages directly with a carrier gear R4 of said bevel gear differential and said gear R1 meshingly engages with gear R2, wherein said gear R3 implements a gear ratio which adapts a speed range of the high-stability two channel transmission apparatus for an input or output application, wherein the two gears R3 and R1 are disposed inside the case, and wherein the case comprises a support structure supporting the second shaft therein;
   wherein a distal end of said third shaft is configured to couple with the input or output application of said high-stability two channel transmission apparatus.

2. The high-stability two channel transmission apparatus of claim 1, wherein the gear ratio implemented by said gear R3 is between 100 and 5000.

3. The high-stability two channel transmission apparatus of claim 1, wherein the high-stability two channel transmission apparatus produces a constant output speed at said third shaft for a given input speed applied at the first shaft.

4. The high-stability two channel transmission apparatus of claim 1, wherein the high-stability two channel transmission apparatus produces a constant output torque at said third shaft for a given input torque applied at the first shaft.

5. The high-stability two channel transmission apparatus of claim 1, wherein the gear R2 and the carrier gear R4 are arranged in parallel planes.

6. The high-stability two channel transmission apparatus of claim 1, wherein the gear R3 and the gear R1 are arranged in parallel planes.

7. The high-stability two channel transmission apparatus of claim 1, wherein the case is filled with a lubricant.

8. The high-stability two channel transmission apparatus of claim 1, wherein the third shaft extends out of the case via a second opening in the case.

9. The high-stability two channel transmission apparatus of claim 8, wherein the second opening in the case comprises a support wall inside said second opening in the case.

10. The high-stability two channel transmission apparatus of claim 1, wherein the first opening in the case comprises a support wall inside said first opening in the case.

11. The high-stability two channel transmission apparatus of claim 1, wherein the support wall is cylindrical or rectangular.

12. The high-stability two channel transmission apparatus of claim 1, further comprising a seal in said first opening in the case.

13. The high-stability two channel transmission apparatus of claim 1, wherein the support structure supporting the second shaft comprises a cylinder and a brace.

14. The high-stability two channel transmission apparatus of claim 13, wherein the second shaft extends through the cylinder.

15. The high-stability two channel transmission apparatus of claim 14, wherein the carrier gear R4 encircles the cylinder.

16. The high-stability two channel transmission apparatus of claim 14, wherein the input or output application of the high-stability two channel transmission apparatus comprises a wind turbine.

17. The high-stability two channel transmission apparatus of claim 14, wherein the input or output application of the high-stability two channel transmission apparatus comprises a generator.

18. The high-stability two channel transmission apparatus of claim 14, wherein the input or output application of the high-stability two channel transmission apparatus comprises a motor.

19. The high-stability two channel transmission apparatus of claim 14, wherein the input or output application of the high-stability two channel transmission apparatus comprises a drive shaft.

20. The high-stability two channel transmission apparatus of claim 14, wherein the input or output application of the high-stability two channel transmission apparatus comprises a winch.

\* \* \* \* \*